United States Patent
Balzarotti et al.

(10) Patent No.: US 10,908,089 B2
(45) Date of Patent: Feb. 2, 2021

(54) METHOD OF HIGH SPATIAL RESOLUTION DETERMINING A POSITION OF A SINGULARIZED MOLECULE WHICH IS EXCITABLE FOR EMISSION OF LUMINESCENCE LIGHT

(71) Applicant: Max-Planck-Gesellschaft zur Foerderung der Wissenschaften e.V., Munich (DE)

(72) Inventors: Francisco Balzarotti, Goettingen (DE); Yvan Eilers, Goettingen (DE); Klaus Gwosch, Goettingen (DE); Stefan W. Hell, Goettingen (DE)

(73) Assignee: MAX-PLANCK-GESELLSCHAFT ZUR FOERDERUNG DER WISSENSCHAFTEN E.V., Munich (DE)

(*) Notice: Subject to any disclaimer, the term of this patent is extended or adjusted under 35 U.S.C. 154(b) by 114 days.

(21) Appl. No.: 16/377,631

(22) Filed: Apr. 8, 2019

(65) Prior Publication Data
US 2019/0234882 A1  Aug. 1, 2019

Related U.S. Application Data

(63) Continuation of application No. PCT/EP2017/075756, filed on Oct. 10, 2017.

(30) Foreign Application Priority Data

Oct. 10, 2016  (DE) .................. 10 2016 119 262
Oct. 10, 2016  (DE) .................. 10 2016 119 263
Oct. 10, 2016  (DE) .................. 10 2016 119 264

(51) Int. Cl.
*G01N 21/64*  (2006.01)
*G02B 21/00*  (2006.01)
*G02B 21/36*  (2006.01)

(52) U.S. Cl.
CPC ..... *G01N 21/6458* (2013.01); *G01N 21/6428* (2013.01); *G02B 21/0076* (2013.01); *G02B 21/365* (2013.01)

(58) Field of Classification Search
CPC .......... G01N 21/6458; G01N 21/6428; G02B 21/365; G02B 21/0076
See application file for complete search history.

(56) References Cited

U.S. PATENT DOCUMENTS 8,174,692 B2  5/2012  Hell et al.
9,024,279 B2  5/2015  Hell
(Continued)

FOREIGN PATENT DOCUMENTS

DE  10 2010 028 138 A1  10/2011
DE  10 2011 055 367 A1  5/2013
(Continued)

OTHER PUBLICATIONS

Engelhardt, J. et al. "Molecular Orientation Affects Localization Accuracy in Superresolution Far-Field Fluorescence Microscopy", NanoLett Jan. 12, 2011; 11 (1):209-13.
(Continued)

*Primary Examiner* — David P Porta
*Assistant Examiner* — Shun Lee
(74) *Attorney, Agent, or Firm* — Thomas | Horstemeyer, LLP

(57) ABSTRACT

For spatial high resolution determining a position of a singularized molecule, which is excitable with excitation light for emission of luminescence light, in a sample, the excitation light is provided with an intensity distribution comprising an intensity increasing region with a known strictly monotonic course of an intensity of the luminescence light over a distance of the singularized molecule to a model point of the intensity distribution. The model point is
(Continued)

arranged at different preliminary positions such that the intensity increasing region extends over a preliminary local area of the sample including the singularized molecule. From intensity values including intensities of the luminescence light separately registered for the preliminary positions of the model point, a further local area is determined which includes the singularized molecule and which is smaller than the preliminary local area. These steps are repeated using the last further local area as the next preliminary local area.

23 Claims, 12 Drawing Sheets

(56) References Cited

U.S. PATENT DOCUMENTS 9,291,562 B2  3/2016  Hell
9,719,928 B2  8/2017  Hell
9,891,417 B2  2/2018  Hell et al.

FOREIGN PATENT DOCUMENTS

| WO | 2006/127692 A2 | 11/2006 | |
|----|----------------|---------|---|
| WO | 2012/171999 A1 | 12/2012 | |
| WO | 2013/072273 A1 | 5/2013 | |
| WO | 2015/097000 A1 | 7/2015 | |
| WO | WO-2015097000 A1 * | 7/2015 | ............ G02B 21/16 |
| WO | 2017/153430 A1 | 9/2017 | |

OTHER PUBLICATIONS

Francisco Balzarotti et al.: "Nanometer resolution imaging and tracking of fluorescent molecules with minimal photon fluxes", Science 355, No. 6325, Feb. 10, 2017, pp. 606-612.

* cited by examiner

METHOD OF HIGH SPATIAL RESOLUTION DETERMINING A POSITION OF A SINGULARIZED MOLECULE WHICH IS EXCITABLE FOR EMISSION OF LUMINESCENCE LIGHT

CROSS REFERENCE TO RELATED APPLICATIONS

This application is a continuation to International Application PCT/EP2017/075756 with an international filing date of Oct. 10, 2017 entitled "Method for the high spatial resolution localization of an individualized molecule which can be excited with excitation light in order to emit luminescent light in a sample" and claiming priority to co-pending German Patent Application Nos. DE 10 2016 119 263.5, DE 10 2016 119 262.7, and DE 10 2016 119 264.3 all three entitled "Verfahren zum räumlich hochauflösenden Bestimmen des Orts eines vereinzelten, mit Anregungslicht zur Emission von Lumineszenzlicht anregbaren Moleküls in einer Probe" and filed on Oct. 10, 2016.

FIELD OF THE INVENTION

The present invention relates to a method of high spatial resolution determining, in one or more spatial dimensions, a position of a singularized molecule which is excitable with excitation light for emission of luminescence light in a sample.

A singularized molecule which is excitable with excitation light for emission of fluorescence light is to be understood as a molecule here, that has a minimum distance to other similar molecules which are excitable with the same excitation light for emission of fluorescence light in a same wavelength range. This minimum distance is safely kept if the distances of the singularized molecules to such similar molecules are at least as high as the diffraction barrier at the wavelength of the luminescence light. In this case, the luminescence light from the different molecules which are excitable with the excitation light for emission of luminescence light can be registered separately. The invention, however, also includes embodiments in which this minimum distance is smaller than the diffraction barrier at the wavelength of the luminescence light.

The luminescence light, for emission of which the singularized molecule is excitable with the excitation light, may particularly be fluorescence light. The emission of the luminescence light by the singularized molecule may, however, be based on any photo-physical process which is excited by the excitation light. All processes of photoluminescence and also, for example, an emission of luminescence light by quantum dots excited with the excitation light belong to these processes.

BACKGROUND OF THE INVENTION

The simplest method of determining a position of a singularized molecule which is excitable with excitation light for emission of fluorescence light consists of actually exciting the molecule with the excitation light for emission of luminescence light and of imaging the luminescence light onto a camera or, more general, onto a spatially resolving detector. In principle, the diffraction barrier at the wavelength of the luminescence light applies to the spatial resolution achievable in the step of imaging. If, however, a plurality of photons of the luminescence light is detected with the spatially resolving detector, which are emitted by a single molecule at a fixed position in the sample, the position of the molecule can be determined from the spatial distribution of these photons over the detector at a precision enhanced by a factor of $1/\sqrt{n}$, "n" being the number of the photons registered. Thus, a plurality of photons of the luminescence light which are emitted by the singularized molecule and registered are a precondition of clearly getting beyond, i. e. below the diffraction barrier in this method which is designated as localization. Thus, there is a danger that the singularized molecules are bleached during or even prior to determining their positions in the sample at the desired precision. Particularly, a repeated determination of the position of the same singularized molecule, as it is necessary for tracking a molecule moving in a sample, is therefore often not possible.

If a singularized molecule emits luminescence light with a directional spatial distribution, this has an influence on the determination of its position from the distribution of the photons of the luminescence light over a spatially resolving detector, i.e. by means of localization, resulting in a position error. This position error depends on the orientation of the molecule in the respective sample. A directional distribution of the emitted luminescence light is, for example, displayed by molecules whose rotation diffusion times are longer than a lifetime of their excited state out of which they emit the luminescence light (see Engelhardt, J. et al. "Molecular Orientation Affects Localization Accuracy in Superresolution Far-Field Fluorescence Microscopy", NanoLett 2011 Jan. 12; 11 (1):209-13).

From WO 2006/127692 A2 it is known to mark a structure of interest in a sample with activatable molecules which are in a non-fluorescent starting state but which can be transferred with activation light into a fluorescent state in which they are excitable with excitation light for emission of luminescence light. Thus, by means of the activation light, a sparse subset of the entirety of the molecules present can be transferred into the fluorescent state. In such a sparse subset, the nearest neighboring molecules in the fluorescent state are spaced apart by more than the diffraction barrier at the wavelength of the excitation light, i.e. they are singularized. If the sample is then subjected to the excitation light, fluorescence light is only emitted by those molecules in the fluorescent state. Thus, the fluorescence light from the individual singularized molecules in the fluorescent state can be registered separately, and the positions of the individual molecules can be determined by localization at a precision beyond the diffraction barrier despite the higher absolute density of the molecules in the samples. An image of the distribution of the molecules in the sample and thus of the structure of interest marked by them is achieved successively in that the steps of activating a sparse subset of the molecules, of exciting the activated molecules for emission of fluorescence light and of registering the fluorescence light with a spatially resolving detector until the respective activated molecules are bleached are repeated and thus carried out for more and more molecules marking the structure of interest.

WO 2006/127692 A2 also describes that the activation of a sparse subset of the entirety of the molecules present, only, can be transferred to other imaging methods. Here, the singularized molecules can be selectively excited for emission of fluorescence light in certain planes or other spatial subunits of the sample by an intensity distribution of the excitation light having intensity maxima delimited by intensity minima.

The method known from WO 2006/127692 A2 is designated as PALM, i.e. as photo-activated localization microscopy. A similar method designated as STORM (stochastic optical reconstruction microscopy) principally has the same advantages and disadvantages.

It is known from U.S. Pat. No. 8,174,692 B2 that even molecules of a standard dye which cannot be activated but have a fluorescent starting state and which may also not be switched between two conformation states, only one of which is fluorescent, may be used in determining the positions of individual molecules by localization. For this purpose, the sample is subjected to such a high intensity of excitation light that the molecules are simultaneously transferred into a relatively long living electronic dark state at a certain transfer probability so that distances of more than the diffraction barrier at the wavelength of the fluorescence light are adjusted between the molecules presently in the fluorescent state.

With the excitation light, the molecules which are presently in the fluorescent state are excited for emission of the fluorescence light which is registered with a camera used as a spatially resolving detector. In this way, successively different molecules of the dye are localized as the molecules from which photons have already been registered get into the dark state out of which other molecules return back into the fluorescent state at a certain transfer probability. This known method may be executed continuously, i.e. one frames after the other may be read out of the camera in a continuous sequence, whereas the sample is continuously subjected to the high intensity of the excitation light which essentially keeps the dye in the dark state and simultaneously excites the fluorescent molecule, which are singularized in this way, for emission of fluorescence light.

The method known from U.S. Pat. No. 8,174,692 B2 is also designated as GSDIM (ground state depletion individual molecule return microscopy).

A principally different method of high spatial resolution determining positions of molecules which are excitable with excitation light for emission of luminescence light is applied in high spatial resolution variants of scanning fluorescence light microscopy. In scanning fluorescence light microscopy, the precision in determining the positions of fluorescent molecules in a sample is based on that, at each point in time, the sample is only locally excited for fluorescence such that the fluorescence light registered for the respective point in time can be assigned to the local area of the excitation. If the molecules in the sample are excited with focused excitation light, the diffraction barrier at the wavelength of the excitation light sets the lower limit for the spatial extensions of the local area of the excitation and thus for the spatial resolution which can be achieved in imaging a structure marked with the fluorescent molecules in the sample.

In STED (stimulated emission depletion) fluorescence light microscopy, molecules by which a structure of interest is marked in a sample are excited by focused excitation light but directly de-excited again in the surroundings of each measuring point by directed emission. This directed emission is stimulated by STED light and inhibits the emission of fluorescence light by the molecules. Fluorescence light registered afterwards may therefore only be emitted out of that area in which the excited molecules have not been de-excited again by means of the STED light. This area in which the excited molecules have not been de-excited again may be kept very small in that it is defined by a zero point of the intensity distribution of the STED light and in that the maximum intensity of the STED light in intensity maxima delimiting the zero point is set so high that the excitation of the molecules is eliminated completely, even very close to the zero point.

Instead of de-exciting a previous excitation of the molecules in parts of the sample, fluorescence inhibition light comprising an intensity distribution having a zero point may also be used to switch fluorescent molecules outside the zero point into a non-fluorescent dark state. This, for example, occurs in RESOLFT (reversible saturable optical fluorescence transitions) microscopy or in GSD (ground state depletion) fluorescence light microscopy.

In the methods known as STED, RESOLFT or GSD fluorescence light microscopy, every molecule, already before fluorescence light emitted by it is registered, in addition to the excitation light, is subjected to the high intensities of the fluorescence inhibition light in the intensity maxima delimiting the zero point of the fluorescence inhibition light. This causes a considerable danger of bleaching the molecules. The danger of bleaching also exists, if a singularized molecule which can be excited with excitation light for emission of luminescence light is tracked with the zero point of the fluorescence inhibition light according to these methods, as a rate of photons of the luminescence light emitted by the singularized molecule has to be continuously maximized for this purpose.

From WO 2012/171999 A1 a method is known in which a sample is scanned with an excitation beam of light which is superimposed with an intensity distribution of STED light comprising a minimum at the focus of the excitation beam of light so quickly that, in each of a plurality of subsequent scanning steps, fluorescence light is only registered in form of individual photons each of which having been emitted by an individual molecule. The positions of the different individual molecules by which these photons have been emitted are assigned to the associated positions of the minimum of the STED light in the sample.

In this method, only few photons, in an extreme case only a single photon is registered for each molecule to which a position in the sample is assigned. These molecules, however, are nevertheless typically subjected to some cycles of excitation and stimulated emission so that bleaching them is not excluded. Further, it is not possible to purposefully track a certain singularized molecule by means of this known method.

A method of tracking an individual fluorescent molecule is known from DE 10 2011 055 367 A1, corresponding to U.S. Pat. No. 9,291,562 B2. The individual fluorescent molecule is excited with excitation light for emission of fluorescence light, and the fluorescence light is registered. The excitation light is directed onto the sample with an intensity distribution comprising a local minimum, and the molecule moving in the sample is tracked with the minimum. For this purpose, the intensity distribution of the excitation light is continuously shifted with regard to the sample so that a rate of photons of the fluorescence light emitted by the molecule is minimized. This means holding the molecules in the minimum of the intensity distribution of the excitation light, which may be a zero point of the intensity distribution of the excitation light.

A method of determining the positions of singularized molecules in a sample, wherein the singularized molecules are in a fluorescent state in which they are excitable with excitation light for emission of fluorescence light, and wherein distances between the singularized molecules of the substance keep a minimum value is known from WO 2015/097000 A1, corresponding to U.S. Pat. No. 9,719,928 B2. The singularized molecules are excited with the excitation light for emission of fluorescence light, wherein an intensity distribution of the excitation light has a zero point. The fluorescence light from the excited singularized molecules of the substance is registered for different positions of the zero point of the intensity distribution of the excitation light in the sample. Here, distances between nearest neighboring positions of the zero point are not higher than half a minimum value of the distance of the singularized molecules. Particularly, the sample is scanned with the zero point, wherein a spacing in scanning the sample is not larger than half the minimum value. The positions of the singularized molecules in the sample are deduced from a course of the intensity of the fluorescence light from the respective singularized molecule over the positions of the zero point of the intensity distribution of the excitation light. For this purpose, a function comprising a zero point can be fitted to the course of the intensity of the luminescence light from the respective singularized molecule; and the position of the zero point of the fitted function can be taken as the position of the respective molecule. The function can be a quadratic function. The fitted function may, however, individually be adapted to the intensity course of the luminescence light from a singularized molecule of the respective substance which results from the intensity course of the excitation light in the surroundings of its zero point.

In the method known from WO 2015/097000 A1, the respective singularized molecule, prior to getting into the neighborhood of the zero point of the intensity distribution of the excitation light in scanning the sample is subjected to the higher intensities of the neighboring intensity maxima of the excitation light. These intensities exceed a saturation intensity of the excitation light above which there is no further increase of the intensity of the luminescence light from the respective singularized molecules so that its course is constant at a saturation value and thus without information content. Correspondingly, very many photons are emitted by each singularized molecule of the substance before the photons are emitted from which the position of the molecule is determined. This causes a considerable danger of bleaching the molecule even if only a limited number of photons is registered at each position of the zero point of the excitation light before the zero point is shifted again.

A method of determining a distribution of a substance in a measurement area by scanning the measurement area with a measurement front is known from DE 10 2010 028 138 A1, corresponding to U.S. Pat. No. 9,024,279 B2. Over a depth of the measurement front which is smaller than the diffraction barrier at the wavelength of an optical signal, the intensity of the optical signal increases to such an extent that a proportion of the substance in a measurement state at first increases from non-existing and then decreases again to non-existing. The measurement front is shifted over the measurement area in opposite direction to the increase in intensity of the optical signal. The measurement signal which can be fluorescence light is registered and assigned to the respective position of the measurement front in the measurement area.

There still is the need of a method of spatial high resolution determining the position of a singularized molecule which is excitable with excitation light for emission of luminescence light in a sample, in which the number of photons for the emission of which the singularized molecule has to be excited, in relation to the precision achieved therewith is considerably reduced as compared to the known methods of spatial high resolution determining the position of a singularized molecule.

SUMMARY OF THE INVENTION

The present invention relates to a method of spatial high resolution determining, in n spatial dimensions, a position of a singularized molecule in a sample, the singularized molecule being excitable with excitation light for emission of luminescence light, and n being 1, 2 or 3. The method comprises providing the excitation light with an intensity distribution which, in each of the n spatial dimensions, comprises at least one intensity increasing region with a known strictly monotonic course of an intensity of the luminescence light from the singularized molecule over a distance of the singularized molecule to a model point of the intensity distribution; determining a preliminary local area in the sample which includes the singularized molecule; directing the excitation light with the intensity distribution onto the sample; arranging the model point of the intensity distribution, in each of the n spatial directions, at different positions in the sample; separately registering the luminescence light emitted by the singularized molecule for each of the different positions of the model point of the intensity distribution in the sample; and deducing the position of the singularized molecule in the sample from the intensities of the separately registered luminescence light. Further, the following steps (i) and (ii) are repeated at least once using the last further local area as the next preliminary local area: (i) in each of the n spatial dimensions, defining at least one preliminary position of the model point of the intensity distribution such that the at least one intensity increasing region associated with the respective one of the n spatial dimensions extends over the preliminary local area in the respective one of the n spatial dimensions; and (ii) from intensity values of the luminescence light which include two intensity values for each of the n spatial dimensions, at least one of which being the intensity of the luminescence light registered for the at least one position of the model point of the intensity distribution in the respective one of the n spatial dimensions, determining a further local area in the sample which includes the singularized molecule and which is smaller than the preliminary local area.

The present invention also relates to repeated executions of the method for determining the positions of a plurality of molecules singularized one after the other or for tracking the singularized molecule, and to using a STED scanning fluorescence light microscope in carrying out or executing the method.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
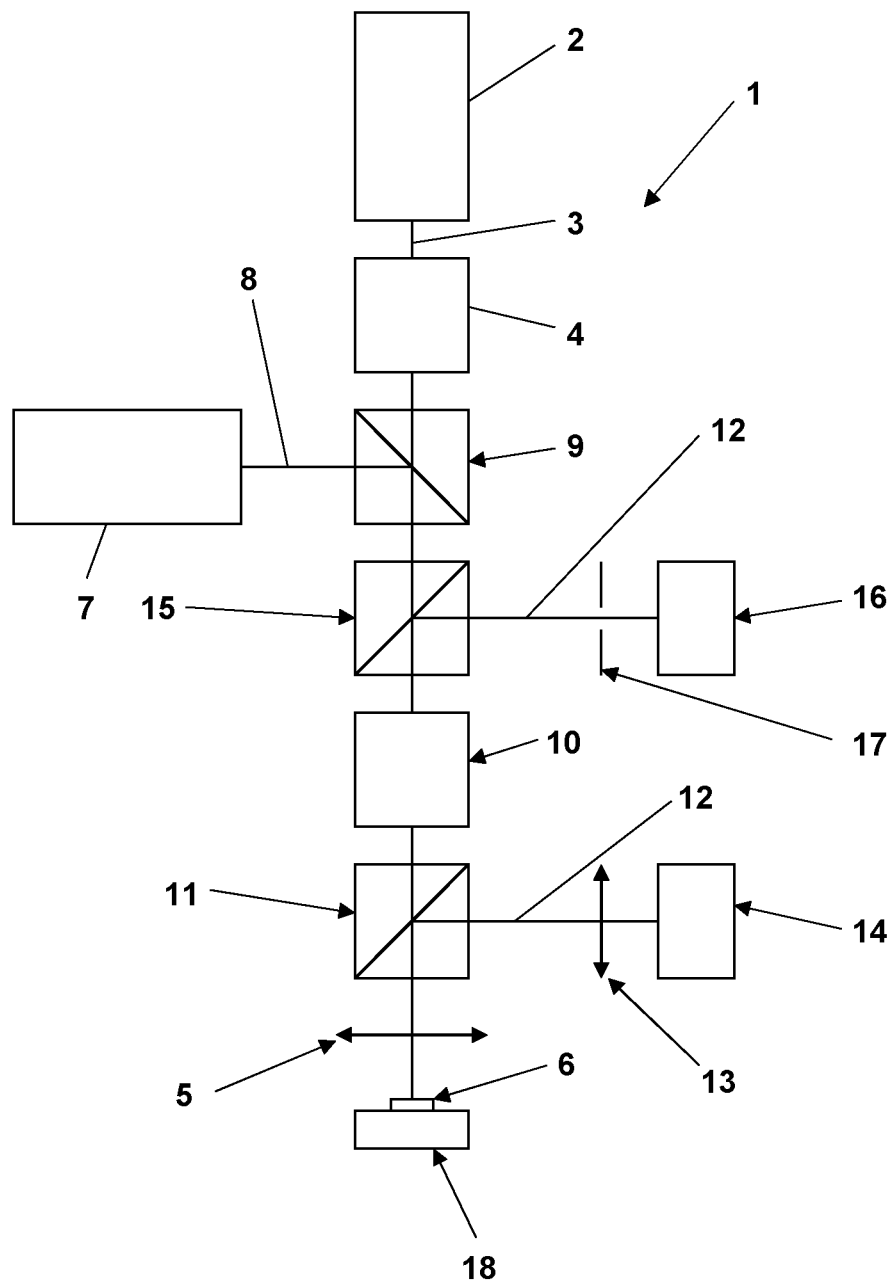
FIG. 1 schematically shows an STED microscope which may be used for carrying out the method for determining the position of a singularized molecule which is excitable with excitation light for emission of luminescence light.

In a first embodiment, a method of spatial high resolution determining a position of a singularized molecule, which is excitable with excitation light for emission of luminescence light, in one or more spatial dimensions in a sample comprises the following features: The excitation light is directed onto the sample with an intensity distribution which has a zero point and regions of increasing intensity which adjoin or delimit the zero point on both sides in each of the spatial dimensions. For each of different positions of the zero point in the sample, the luminescence light emitted by the molecule is registered, and the position of the molecule in the sample is deduced from the intensities of the luminescence light registered for the different positions of the zero point. The zero point is arranged at not more than n×3 different positions in the sample to deduce the position of the molecule in n spatial dimensions from the intensities of the luminescence light registered for the different positions of the zero point.

In a second embodiment, a method of spatial high resolution determining a position of a singularized molecule, which is excitable with excitation light for emission of luminescence light, in one or more spatial dimensions in a sample comprises the following features: the excitation light is directed onto the sample with an intensity distribution comprising a zero point and intensity increasing regions which adjoin the zero point on both sides in each of the spatial direction. The zero point is shifted in the sample in each of the spatial dimensions, and luminescence light emitted by the molecule is registered for each position of the zero point in the sample. A starting local area in the sample is determined in which the molecule is arranged. In each of the spatial dimensions, at least one starting position of the zero point is determined such that it is on one side of the starting local area in the respective spatial dimension. The luminescence light is quasi-simultaneously registered for all positions of the zero point assigned to all spatial dimensions in that the zero point is repeated shifted between these positions. The positions of the zero point are successively shifted into the starting local area depending on the photons of the luminescence light registered for each of the positions.

In a third embodiment, a method of spatial high resolution determining a position of a singularized molecule, which is excitable with excitation light for emission of luminescence light, in one or more spatial directions in a sample comprises the following features: the excitation light is directed onto the sample with an intensity distribution which has an intensity increasing region with known strictly monotonic course of the intensity of the excitation light over a distance to a model point of the intensity distribution in each of the spatial dimensions. The model point of the intensity distribution is arranged at different positions in the sample in each of the spatial dimensions. For each position of the model point of the intensity distribution in the sample, the luminescence light emitted by the molecule is registered, and the position of the molecule in the sample is deduced from the intensities of the luminescence light registered. Particularly, a starting or preliminary local area in the sample is determined in which the molecule is arranged. Then, (i) in each of the spatial dimensions, at least one position of the model point of the intensity distribution is defined such that the at least one intensity increasing region extends over the preliminary local area in the respective spatial dimension. Further, (ii), from the intensity values of the luminescence light which include two intensity values per each of the spatial dimensions, one of which indicating the intensity of the luminescence light registered for the at least one position of the model point of the intensity distribution, a further local area in the sample is determined in which the molecule is arranged and which is smaller than the starting local area. The steps (i) and (ii) are repeated at least once using the further local area as the new preliminary local area.

In this specification and the appending claims, the formulation that the method serves for spatial high resolution determining the position of the singularized molecule particularly means that a spatial resolution clearly below the diffraction barrier at the wavelength of the excitation light and also at the wavelength of the luminescence light is achieved which can be seen from the achievable precision of 10 nm and even much better. In this context it is to be noted that the formulation "spatial resolution" is used as a synonym here for the precision at which the position of the respective singularized molecule in the sample is determined.

The formulation that the method serves for determining the position of a singularized molecule means, as already stated at the beginning, that the position of the singularized molecule has a minimum distance to nearest neighboring similar molecules which can be excited with the same excitation light for emission of luminescence light in the same wavelength range so that the luminescence light from the nearest neighboring similar molecules can not be separated due to different wavelengths. In all embodiments of the method, this minimum distance is of the order of the diffraction barrier at the wavelength of the luminescence light or smaller. In fact, this minimum distance, like in the method known from WO 2015/097000 A1, may even be considerably smaller than the diffraction barrier at the wavelength of the luminescence light as long as it is not smaller than an extension of an intensity increasing region of the intensity distribution of the excitation light in the respective spatial dimension, over which the intensity of the excitation light is below a saturation intensity so that the intensity of the luminescence light emitted by the respective molecule remains below a saturation value. If the distance of the singularized molecule to nearest neighboring molecules excitable with the excitation light for emission of luminescence light remains larger than the diffraction barrier at the wavelength of the luminescence light, the luminescence light emitted by the singularized molecule can be registered separately from luminescence light emitted by the nearest neighboring molecules with a spatially resolving detector. If the distance of the singularized molecules is at least not smaller than a region of the intensity distribution of the excitation light which is influenced by the intensity increasing region with regard to the intensity of the luminescence light emitted by the molecules, the difference of the intensity of the luminescence light registered to the saturation value at the saturation intensity of the excitation light may directly be attributed or assigned to the singularized molecule as this molecule is the only one which is in the region of the intensity distribution of the excitation light influenced by the intensity increasing region.

The formulation that the singularized molecule is excitable with the excitation light for emission of luminescence light means that the singularized molecule is photo-luminescent. Particularly, the singularized molecule may be fluorescent, i.e. it may be excitable for emission of fluorescence light with the excitation light. At this point it is to be pointed out that the terms "luminescent" and "fluorescent" here only indicate that the singularized molecule can be excited with the excitation light for emission of luminescence light or fluorescence light. The terms do not indicate that the singularized molecule is already luminescing or fluorescing, i.e. that it has already been excited with the excitation light.

The formulation that the excitation light, in the first and second embodiment of the method, is directed onto the sample with an intensity distribution which has a zero point and intensity increasing regions which are delimiting or adjoining the zero point on both sides in each of the spatial dimensions may mean that the zero point with the adjoining intensity increasing regions is formed by destructive interference which has a different effect at different distances to the zero point. Over each of the intensity increasing regions adjoining the zero point, the intensity of the excitation light strictly monotonically, i.e. continuously, increases with increasing distance to the zero point.

The zero point may be an ideal zero point generated by destructive interference in which the intensity of the excitation light actually goes down to zero. A small remaining or residual intensity of the excitation light in the zero point, however, is harmless, particularly as it is no goal of the first and second embodiment of the method to position the zero point in the sample such that its position coincides with the position of the molecule in the sample. For the same reason, the zero point delimited by the intensity increasing regions may in principle also be generated by Gaussian intensity distributions arranged at a distance in the respective spatial dimension, and particularly by the intensity minimum remaining between them.

Even with a two-dimensional zero point and intensity increasing regions only extending in a single spatial dimension, the position of the molecule in the sample can be determined at a high spatial resolution in two or all three spatial dimensions. In a same way, with a one-dimensional or line-shaped zero point and intensity increasing regions only increasing in two spatial dimensions, the position of the singularized molecule in the sample may not only be determined in these two but also in all three spatial dimensions at a high spatial resolution. For this purpose, the intensity increasing region(s) is/are to be orientated in different spatial dimensions in executing the first and the second embodiments of the method.

The present method may be regarded as starting from a method of spatial high resolution determining the position of a singularized molecule in one or more spatial dimensions in a sample, wherein the sample is excitable with excitation light for emission of luminescence light, which is known from WO 2015/097000 A1.

In the first embodiment of the method, the excitation light, like in the starting method, is directed onto the sample with an intensity distribution comprising a zero point and intensity increasing regions which adjoin the zero point on both sides in each of the spatial dimensions. For each of the different positions of the zero point in the sample, the luminescence light emitted by the molecule is registered, and the position of the molecule in the sample is deduced from the intensities of the luminescence light registered for the different positions of the zero point.

Different from the known method, the zero point, in the first embodiment of the method, is arranged at not more than n×3 different positions in the sample to deduce the position of the molecule in the n spatial dimensions from the intensity of the luminescence light registered for these different positions. In fact, it has been found that, with a suitable selection of the positions of the zero point in the sample, the position of the molecule in the sample in the n spatial dimensions can be deduced from the intensities of the luminescence light for not more than n×3 different positions at a precision which is not lower than with spatially, i. e. completely, scanning the local area in the sample including the position of the molecule. Further, with a suitable selection of the positions as it will be described in the following, this precision may already be achieved if the zero point is arranged at not more than (n×2)+1 or even only n+2 different positions in the sample. Here, it is often not even necessary to increase the number of photons of the luminescence light registered for each of the positions of the zero point in the sample as compared to the number of photons which are suitably registered at each position of the zero point in spatially scanning the sample.

Thus, in the first embodiment of the method, the position of the singularized molecule in the sample is very quickly determined in each spatial dimension, i.e. on basis of a very small number of photons emitted by the singularized molecule and registered. The precision at which the position of the singularized molecule is determined may without problem reach 10 nm and thus clearly gets below the diffraction barrier at the wavelength of the luminescence light.

As already mentioned, the sample is not scanned spatially, i. e. completely, not even in a limited local area of the sample in which the molecule is assumed in the first embodiment of the method. Instead the zero point is only positioned at very few positions with regard to, i. e. in or close to this local area.

In deducing the position of the molecule in the sample from the intensities of the luminescence light registered for the different positions of the zero point, the dependency of the intensity of the luminescence light which is emitted by the singularized molecule on the distance of the singularized molecule to the zero point of the intensity distribution of the excitation light has to be considered. This dependency results from the course of the intensity of the excitation light in the intensity increasing regions adjoining the zero point and also from the photo-physical process on which the excitation of the molecule for the emission of the luminescence light is based. Thus, with a zero point formed by destructive interference and a photoluminescence of the molecule based on a single photon process the dependency of the intensity of the luminescence light emitted by the molecule on its distance to the zero point will approximately be quadratic. With a photoluminescence on basis of a two photon process, this dependency is stronger and will follow a function $x^4$. De facto, in the first embodiment of the method, the course of the intensity of the excitation light in the intensity increasing regions adjoining the zero point has only to be known to such an extent as it has an effect on the intensity of the luminescence light from the molecule. I.e. the dependency of the intensity of the luminescence light from the molecule on the distance of the molecule to the zero point has to be known to consider it in deducing the position of the molecule in the sample from the intensity of the luminescence light registered. This dependency, however, can easily be determined, for example empirically by once scanning the surroundings of a singularized molecule with the zero point in small steps.

Particularly, the position of the molecule can be deduced from the intensities of the luminescence light registered for the different positions of the zero point in that a function is fitted to these intensities, which describes the course of the intensity of the luminescence light from the molecule over the distance of the molecule to the zero point in the different spatial dimensions and which also has a zero point. The position of the zero point of the fitted function in the sample may then be taken as the position of the molecule.

The fact that the position of the molecule is deduced from the intensities of the luminescence light which is registered for the different positions of the zero point does not only include the option of considering different rates of photons of the luminescence light but also the option of considering intervals in time at which the photons are registered. Here, it is to be understood that the average value of the intervals in time at which the photons are registered is equal to the reciprocal value of the rate of the photons of the luminescence light registered for a respective position of the zero point.

In addition to the intensities of the luminescence light registered for the different positions of the zero point, a measure of the relative luminosity of the singularized molecule can be considered in deducing the position of the molecule. This measure may particularly be a maximum intensity of the luminescence light emitted by the molecule when excited with the excitation light or an intensity value directly correlated therewith. The maximum intensity or the intensity value correlated therewith may indeed be measured for the respective singularized molecule or estimated for all potential singularized molecules with a fixed value.

In order to do with a particularly small number of different positions at which the zero point is arranged in the sample, the different positions can be arranged such that they, in each spatial dimension in which the position of the molecule and the sample is determined, include one position on both sides of a center of the local area in the sample in which the molecule is arranged. This, however, does not mean that two extra positions of the zero point have to be provided for each spatial dimension. For example, three positions which are arranged in the corners of a particularly equilateral triangle in one plane also include at least two positions in any spatial dimension within the plane, which are arranged on different sides of the center point of the triangle. The same applies to an equilateral tetrahedron with regard to all possible spatial dimensions.

In the first embodiment of the method, it is further preferred if the different positions at which the zero point is arranged in the sample, besides the two positions on both sides of the center of the local area, include a position in the center of this local area in each spatial dimension in which the position of the molecule in the sample is determined. This one position in the center of the local area may be the same one for all spatial dimensions.

Particularly, in that case that the position of the molecule is determined in two spatial dimensions, the different positions at which the zero point is arranged in the sample may be a center position and three peripheral positions, i.e. four positions in total, the peripheral positions being arranged on an arc of a circle around the central position in a plane spanned by the two spatial dimensions and running through the central position. In other words, the three peripheral positions are arranged in the corners of an equilateral triangle, and the central position is in the center of the triangle.

When the position of the molecule is determined in all three spatial dimensions, the different positions at which the zero point is arranged in the sample may include a central position and four peripheral positions, the peripheral positions being equidistantly arranged on a spherical shell around the central position. In other words, the peripheral positions are arranged in the corners of an equilateral tetrahedron, and the central position is in the center of the tetrahedron.

As already mentioned, the entire local area of the sample in which the molecule is assumed should, with regard to each position of the zero point, be in a region of the intensity distribution of the excitation light in which the intensity in the intensity increasing regions adjoining the zero point remains below the saturation intensity of the excitation light above which a further increase of the intensity of the excitation light does no longer result in a higher intensity of the luminescence light from the singularized molecule. In the first embodiment of the method it is preferred that a maximum intensity, i.e. an absolute intensity level of the excitation light, is always adjusted such that a maximum distance of each position of the zero point to any point between the positions of the zero point in the sample is not higher than an extension of each intensity increasing region in the direction of the distance. It is even more preferred if the maximum distance is not larger than an extension of each intensity increasing region in the direction of the distance over which the intensity of the excitation light increases up to 90% of a saturation intensity of the excitation light.

In the first embodiment of the method, the intensity increasing regions adjoining the zero point may be rotation-symmetric with regard to the zero point. At least, this rotation-symmetry may be given in a main plane orthogonal to that direction in which the excitation light is directed onto the sample. It is, however, also possible that the excitation light differs with regard to its wavelength and/or its polarization, and/or the intensity regions adjoining the zero point in the different spatial dimensions differ with regard to the course of the intensity of the excitation light depending on the respective position of the zero point. This may be the case to pursue the goal to determine the position of the molecule at each point between the positions of the zero point in each of the spatial dimensions at a same precision. It is, however, to be understood that in this case the maximum possible precision in determining the position of the singularized molecule is not completely exploited in certain spatial dimensions. Vice versa, each singularized molecule represented by a spot having the extensions of the precision achieved appears as a small circle or sphere, only if this precision is the same in all spatial dimensions.

In the first embodiment of the method, the luminescence light may be quasi-simultaneously registered for the different positions of the zero point in the sample in that the zero point is repeatedly shifted between the positions in the sample. For this purpose, the same intensity distribution of the excitation light may be shifted by means of scanner. It is, however, also possible to separately form the intensity distribution for each of the different positions of its zero point in the sample, for example by means of a spatial light modulator arranged in the beam path of the excitation light. Then, one may at least insofar do without a scanner. Further, it is possible to shift the zero point in the sample in that the excitation light is one after the other provided by completely or partially different light sources. With all these possible variants of the first embodiment of the method, the zero point can be repeatedly shifted between its positions in the sample. It is to be understood that the luminescence light from the molecule belonging to the individual positions of the zero point is registered separately. The quasi-simultaneous registration of the luminescence light for the different positions of the zero point has the advantage that subjecting the sample to the excitation light and registering the luminescence light from the sample may be stopped or aborted as soon as the photons of the luminescence light registered for the individual positions of the zero point already allow for deducing the position of the molecule at a desired precision from the intensities of the luminescence light registered for the different positions of the zero point.

A corresponding abort criterion may also be applied with a continuous registration of the luminescence light for each position of the zero point in the sample. There are, however, cases in which the luminescence light registered for all positions of the zero point already indicates after a lower total number of photons from the molecule that the position of the molecule may be deduced at the desired precision.

If, in the first embodiment of the method, the luminescence light is registered for the positions of the zero point of the intensity distribution of the excitation light only until the intensities of the luminescence light registered for the positions are determined at such an accuracy that the position of the molecule can be deduced at a desired precision, this desired precision can be in the range of 20 nm or smaller, i.e. better. It may also be smaller or better than 10 nm. Even a desired precision in the order of 1 nm and thus down to 0.5 nm is possible. In principle, the first embodiment of the method has no inherent barrier to the precision achievable in determining the position of the singularized molecules in the sample. Circumstances of the respective individual case like, for example, a decreasing signal-to-noise-ratio may, however, limit the precision achievable in practice.

A repeated execution of the first embodiment of the method with decreasing distances of the positions of the zero point in the sample, wherein the positions of the zero point in the sample, in each repetition of the method, are arranged around the position of the molecule in the sample which has been deduced in the previous execution of the method from the registered intensity of the luminescence light, may serve for iteratively increasing the precision achievable with the first embodiment of the method. With the distances between the positions of the zero point in the sample getting smaller, the maximum intensity of the excitation light may be increased. In this way, the getting smaller limited local area in which the molecule is presumably located may then again be spread over the full bandwidth of the different intensities of the excitation light in the intensity increasing regions and thus over the full bandwidth of the different intensities of the luminescence light from the singularized molecule.

In the second embodiment of the method, the excitation light, like in the starting method known from WO 2015/097000 A1, is directed onto the sample with an intensity distribution which has a zero point and intensity increasing regions which adjoin or delimit the zero point in each of the spatial dimensions on both sides. This zero point is shifted in the sample in each of the spatial dimensions, and for each position of the zero point in the sample the luminescence light emitted by the molecule is registered separately.

In the second embodiment of the method, in addition to the known method, at first an initial or preliminary local area in which the molecule is located in the sample is determined. Then, in each spatial direction, at least one preliminary position of the molecule is defined such that it is on one side of the preliminary local area in the respective spatial dimension. The luminescence light is quasi-simultaneously registered for all the positions of the zero point associated with all spatial dimensions in that the zero point is repeatedly shifted between these positions, and the positions of the zero point are successively shifted into the preliminary local area depending on the photons registered for each of the positions.

In this way, the positions of the zero point assigned to all spatial dimensions are very quickly, i.e. on basis of a very low number of photons emitted by the singularized molecule and registered, approximated to the actual position of the molecule in the sample, and thus condensed to a local area of a strongly reduced size as compared to the preliminary local area. The extensions of the strongly reduced local area correspond to a precision at which the position of the singularized molecule is determined. These extensions may without problem get smaller than 10 nm and thus clearly below the diffraction barrier at the wavelength of the luminescence light.

In the second embodiment of the method, the sample, even in the preliminary local area of the molecule, is not scanned spatially, i. e. completely. Instead, the positions of the zero point of the intensity distribution are shifted towards the actual position of the molecule based on the photons of the luminescence light registered for the previous positions of the zero point of the intensity distribution intelligently, i.e. exploiting all information available from the registered photons of the luminescence light up to now with regard to the actual position of the singularized molecule to a maximum extent, and thus, as a rule, in one direction only. In the second embodiment of the method, the positions of the zero point are thus not shifted according to a trial and error method but always in a direction towards the actual position of the molecule in the sample even if the positions of the zero point will not necessarily be shifted along the shortest ways to the actual position of the molecule.

In successively shifting the zero point, a measure of the relative brightness of the singularized molecule can be considered to, for example, determine a distance over which the zero point may be shifted at a time. This measure can particularly be a maximum intensity of the luminescence light from the molecule when excited with the excitation light, or an intensity value directly correlated therewith. The maximum intensity or the intensity value correlated therewith may be actually measured for the singularized molecule or estimated with a fixed value for all potentially singularized molecules.

In the second embodiment of the method, the luminescence light for the respective different positions of the zero point in the sample is quasi-simultaneously registered in that the zero point is repeatedly shifted between these different positions in the sample. For this purpose, the same intensity distribution of the excitation light may be shifted by means of a scanner. It is, however, also possible to separately form or generate the intensity distribution for each of the different positions of its zero point in the sample, for example by means of a spatial light modulator arranged in the beam path of the excitation light. Then, one may at least insofar do without a scanner. Further, it is possible to shift the zero point in the sample in that the excitation light is successively provided by different light sources, completely or in parts. With all these variants of the second embodiment of the method, the zero point can be very quickly repeatedly shifted between its different positions in the sample. It is to be understood that the luminescence light from the molecule belonging to the individual positions of the molecule is registered separately. Due to the quasi-simultaneous registration of the luminescence light for the different positions of the zero point of the intensity distribution of the excitation light, the subjection of the sample to the excitation light and the registration of the luminescence light from the sample can immediately be stopped as soon as the photons of the luminescence light registered for the individual positions of the zero point of the intensity distribution of the excitation light already allow for shifting the positions further towards the actual position of the molecule in the sample.

In the second embodiment of the method, the positions of the zero point may particularly be successively shifted into the preliminary local area depending on rates or intervals in time at which the photons of the luminescence light are registered for each of the positions. Here, it is to be understood that the average value of the intervals in time is equal to the reciprocal value of the rate at which the photons of the luminescence light are registered for the respective position of the zero point of the intensity distribution of the excitation light.

The step of purposefully shifting the positions of the zero point into the preliminary area may for example at first pursue the goal to match the rates or the corresponding intervals in time at which the photons of the luminescence light are registered for the individual positions to each other. For this purpose, the position of the zero point for which the photons of the luminescence light are registered at the highest rate or at the shortest intervals in time may be shifted in a direction towards the positions of the zero point with the smallest rates or the longest intervals in time. Simultaneously or afterwards, all positions of the zero points may be shifted into the preliminary local area to minimize the rates or to maximize the intervals in time at which the photons are registered for all of them. If, for example, the rates or the intervals in time at which the photons are registered for all positions of the zero point have already been matched to each other, these positions may further be shifted into the local area towards their common center to minimize the rates or maximize the intervals in time of the photons.

A number of the positions of the zero points, which are defined with regard to the preliminary local area and which are then shifted according to the second embodiment of the method, may be between n and 2 n, n being the number of spatial dimensions in which the singularized molecule is localized. I.e. the number of the positions of the zero point may be very small. At least one position of the zero point is needed for each of the spatial dimensions, in which the position of the molecule in the sample is to be determined, to be able to purposefully shift the entirety of the positions of the zero point on basis of the photons of the luminescence light registered for them. With two positions of the zero point per each spatial dimension, the actual position of the molecule in the sample can be successively approached from both sides as it will be explained below in more detail.

In the second embodiment of the method, in at least one of the spatial dimensions, the position of the molecule in the sample may be assumed at that position of the zero point associated with the respective spatial dimension at which the rate or the intervals in time of the photons of the luminescence light emitted by the singularized molecule is minimal or maximal, respectively. In this variant of the second embodiment of the method, the respective zero point has to be shifted to coincide with the molecule in the sample as good as possible.

In at least one of the spatial dimensions, the position of the molecule may alternative be deduced from the rate or the intervals in time at which the photons of the luminescence light are registered for at least one of the positions of the zero point associated with the respective spatial dimension.

Herein, the dependency of the rate or the interval in time of the photons of the luminescence light on the spatial distance of the singularized molecule to the zero point of the intensity distribution of the excitation light is to be considered. This dependency results from the course of the intensity of the excitation light in the intensity increasing regions and also from the photo-physical process which is the basis of the excitation of the molecules for the emission of the fluorescence light. Thus, with an intensity increasing region adjoining a zero point formed by destructive interference and a photoluminescence on basis of a one photon process there will be an approximately quadratic dependency of the intensity of the luminescence light emitted by the molecule on the distance to the zero point. With a photoluminescence on basis of a two photon process, this dependency is stronger and follows a function $x^4$. In practice, the course of the intensity of the excitation light in the intensity increasing region has only to be known insofar as it has an effect on the intensity of the luminescence light from the molecule. I.e. the dependency of the intensity of the luminescence light on the distance of the molecule to the zero point of the intensity distribution of the excitation light has to be known to be able to use it for the determination of the actual position of the molecule in the sample. This dependency can be easily determined, for example empirically by scanning the surroundings of the molecule with the zero point in small steps.

In deducing the actual position of the molecule in the sample from the rate or the distances in time of the photons of the luminescence light which are registered for at least one position of the zero point assigned to the respective spatial dimension, a further rate or further intervals in time of photons of the luminescence light may be considered. This may be a further rate or these may be further intervals in time of photons of the luminescence light which are registered for a further position of the zero point assigned to the respective spatial dimension. In this case, the distance of the positions of the zero point in the respective spatial dimension has also to be considered. Alternatively or additionally, the already mentioned measure of the relative brightness of the singularized molecule may be considered in deducing the position of the molecule in the sample from the rate or the intervals in time at which the photons of the luminescence light are registered for the at least one position of the zero point.

In a variant of the second embodiment of the method, the preliminary positions of the zero point include two positions per each spatial dimension, which, in the respective spatial dimension, are located on both sides of the preliminary local area. By successively shifting the positions of the zero point assigned to all spatial dimensions depending on the rates or the intervals in time at which the photons of the luminescence light are registered for all positions of the zero point, a local area of the molecule remaining between the positions of the zero point is successively reduced in size. In doing so, there is no need to predetermine two separate or extra preliminary positions of the zero point per each spatial dimension. Instead, one of the preliminary positions of the zero point may also be assigned to more than one spatial dimension. Thus, for example, the preliminary positions of the zero point for determining the position of the molecule in two spatial dimensions may be arranged in the corners of a triangle in a plane which is defined by these two spatial dimensions, i.e. the preliminary positions of the zero point may amount to just three positions in total. Correspondingly, the preliminary positions of the zero point for determining the position of the molecule in three spatial dimensions may be arranged in the corners of a tetrahedron. Generally, it is, however, also possible to have two separate or extra positions of the zero point per spatial dimension in which the position of the molecule is determined in the sample. With regard to the aspect of determining the position of the molecule in the sample based on an as low number of photons of the luminescence light as possible, the resulting higher number of positions of the zero point in the sample for which the luminescence light is registered, might, however, not be ideal.

Particularly, if the preliminary positions of the zero point in each of the spatial dimensions include two positions which are located on both sides of the preliminary local area in the respective spatial dimension, it is preferred that the intensity increasing regions adjoining the zero point in each of the spatial dimensions are symmetric with regard to the zero point. It is even more preferred if the intensity increasing regions in all spatial dimensions in which the position of the molecule in the sample is determined are rotationally symmetric with regard to the zero point.

The local area of the molecule remaining between the positions of the zero point may successively be reduced in size until its extensions are no longer larger than a predetermined precision. This predetermined precision may be in a range of 20 nm or smaller, i.e. better. It may also be smaller or better than 10 nm. Even a predetermined precision in the order of 1 nm and thus down to 0.5 nm is possible. In principle, the second embodiment of the method has no inherent barrier to the precision achievable in determining the position of the singularized molecule in the sample. The circumstances of an individual case, like for example a decreasing signal-to-noise-ratio, however, may limit the precision achievable in practice.

Thus, getting below a predetermined signal-to-noise-ratio may be defined as an abort criterion for further shifting the positions of the zero point in the second embodiment of the method. This signal-to-noise-ratio may be enhanced by reducing the size of a pinhole aperture arranged in front of a point detector with which the luminescence light emitted by the singularized molecule is registered confocally with regard to the respective position of the zero point in the sample. This reduction of the size of the pinhole aperture comes along with a reduction of the yield of photons registered as compared to the photons of the luminescence light emitted by the molecule. Thus, this reduction may be limited to the final positions of the zero point in the closest neighborhood of the actual position of the molecule in the sample in which the signal-to-noise-ratio typically becomes critical.

In the second embodiment of the method, at least one of the positions of the zero point which are assigned to all spatial dimensions in which the position of the molecule in the sample is determined may be shifted as soon as in average p photons of the luminescence light have been registered at the present positions. p may be comparatively small or even very small. Particularly, p may have a value which is not higher than 30, not higher than 20, not higher than 10 or even not higher than 5. It is to be understood that it depends on the value of p how far the at least one of the positions is suitably shifted, because p, due to the basics of statistics, determines the precision at which the rates or the intervals in time of the photons of the luminescence light can be determined for the present individual positions of the zero point.

Alternatively or additionally, at least one of the positions of the zero point assigned to all spatial dimensions can be shifted as soon as n×q photons of the luminescence light have been registered in total at all present positions. Here, n is the number of the spatial dimensions in which the position of the molecule in the sample is determined. q may also be comparatively small. Particularly, q may be equal to or smaller than 50 or equal to or smaller than 25 or even equal to or smaller than 5. It also applies here that it depends on the value of q how far the at least one position of the zero point can be shifted in a suitable way upon reaching n×q registered photons.

In a further variant of the second embodiment of the method, the position of each zero point is shifted as soon as m-photons of the luminescence light have been registered at the present positions of the zero point. Here, m may also be small or even very small. Particularly, m may be 30 or smaller, 20 or smaller, 10 or smaller or even 5 or smaller down to only 1.

Particularly with very small values of m, it is to be understood that in shifting the positions of the zero point only significant photons of the luminescence light from the molecule are to be considered, if possible, which means that such photons are neglected which have been registered but which are to be allotted or attributed to a noise. If the zero point is no ideal zero point in which the intensity of the excitation light goes down to zero, a rate of photons of the luminescence light from the molecule which is associated with a remainder or residual value of the intensity of the excitation light in the zero point may be regarded as such an insignificant noise and deducted before the rate or the intervals in time of the photons is/are determined which is/are used as the basis for shifting the positions of the zero point.

As already mentioned before, the entire preliminary local area, with each position of the zero point, should be in a region of the intensity distribution of the excitation light in which the intensities of the excitation light in the intensity increasing region remain below a saturation intensity of the excitation light, above which a further increase of the intensity of the excitation light does not result in a high intensity of the luminescence light from the singularized molecule. In the second embodiment of the method, it is preferred that a maximum intensity, i.e. an absolute intensity level of the excitation light, is always adjusted such that the preliminary local area, with regard to each position of the zero point of the intensity distribution of the excitation light, is in a region of not more than 90% of the saturation intensity of the excitation light.

When successively shifting the positions of the zero point, the maximum intensity of the excitation light may successively be increased. With successively shifting the positions of the zero point, their distances to the actual position of the molecule in the sample is reduced. By increasing the maximum intensity of the excitation light, the reduced distances are newly distributed over a higher bandwidth of different intensity of the luminescence light from the singularized molecule.

For example, the absolute intensity of the excitation light may be increased such that a rate of the photons registered for all present positions of the zero point remains equal. This is equivalent to that the average interval in time at which these photons are registered remains the same. Keeping the rate or the average interval in time at a constant level by increasing the absolute intensity of the excitation light may at least be striven for temporarily, i.e. for a part time of shifting the positions of the zero point.

Particularly, the maximum intensity of the excitation light may be increased by at least 50% in total while shifting the positions of the zero point. The maximum intensity may also be increased by at least 100% or up to three times, four times or multiple times its starting value.

In the third embodiment of the method, the excitation light, like in the starting method known from WO 2015/097000 A1, is directed onto the sample with an intensity distribution which has at least one intensity increasing region with a known strictly monotonic course of the intensity of the excitation light over a distance to a model point of the intensity distribution in each of the spatial dimensions. This model point of the intensity distribution is arranged at different positions in the sample in each of the spatial dimensions. For each position of the model point of the intensity distribution in the sample, the luminescence light emitted by the molecule is registered; and the position of the molecule in the sample is deduced from the intensities of the luminescence light registered.

In the third embodiment of the method, in addition to the known method, at first a preliminary local area of the sample is determined in which the molecule is located. Then, (i) a position of the model point of the intensity distribution is determined in each spatial dimension in such a way that the at least one intensity increasing region extends over the entire preliminary local area in the respective spatial dimension, and (ii) a further local area in the sample is determined, in which the molecule is located and which is smaller than the preliminary local area, from intensity values of the luminescence light, which include two intensity values per each spatial dimension, one of the two intensity values per each spatial dimension indicating the intensity of the luminescence light registered for the at least one position of the model point of the intensity distribution. The steps (i) and (ii), including arranging the model point of the intensity distribution of the excitation light at the positions determined or defined in step (i) and registering the luminescence light emitted from the molecule for each of these positions, are at least repeated once using the further local area as a new preliminary local area.

In this way, the position of the singularized molecule in the sample is very quickly, i.e. on basis of a very small number of photons emitted by the singularized molecule and registered, confined to a small local area in all of the spatial dimensions. The size of this small local area corresponds to the precision at which the position of the singularized molecule is determined. It may without problem become smaller than 10 nm and thus clearly smaller than the diffraction barrier at the wavelength of the luminescence light.

In the third embodiment of the method, the sample, even in the preliminary local area of the molecule, is not scanned spatially, i. e. completely. Instead, the positions of the model point of the intensity distribution are intelligently defined with regard to the preliminary local area based on the intensities of the luminescence light registered for the previous positions of the model point of the intensity distribution, i.e. making maximum use of all information on the actual position of the singularized molecule available from the registered intensities of the luminescence light. In the third embodiment of the method, the defined positions of the model point may even completely spare the preliminary local area as such.

That the excitation light, in the third embodiment of the method, is directed onto the sample with an intensity distribution which, in each of the spatial dimensions, has at least one intensity increasing region with a known strictly monotonic course of the intensity of the excitation light over a distance to a model point of the intensity distribution may mean that the intensity increasing region is formed by destructive interference which is differently strong at different distances to the model point. Further, the intensity of the excitation light in the at least one intensity increasing region may increase starting from zero, i.e. for example starting from a complete destructive interference of the excitation light. Then, the intensity increasing region particularly includes small or low intensities of the excitation light which just marginally stress the singularized molecule by exciting it for emission of luminescence light. The intensity increasing region may adjoin a zero point of the intensity distribution of the excitation light, which, at the opposite side in the respective spatial dimension, is adjoined by a further intensity increasing region. The two intensity increasing regions can be symmetric with regard to the zero point. The zero point may be used as the model point of the intensity distribution of the excitation light which then has the advantage to be close to the smallest intensities of the excitation light which just marginally stress the singularized molecule. Generally, the model point of the intensity distribution of the excitation light may be any model point whose respective position in the sample can be defined and which, correspondingly, may be arranged at defined positions in the sample. If the model point of the intensity distribution of the excitation light is a zero point adjoined by the intensity increasing regions, the intensity of the excitation light strictly monotonically, i.e. continuously, increases over each of these intensity increasing regions with increasing distance to the model point. Depending on the type of the model point of the intensity distribution, the intensity of the excitation light may instead strictly monotonically decrease over the intensity increasing regions with increasing distance to the model point.

Independently on whether two intensity increasing regions adjoining a zero point or any other model point of the intensity distribution of the excitation light are symmetric with regard to the model point, both intensity increasing regions may be used in the third embodiment of the method in that, for example, positions of the model point on opposite sides of the preliminary local area are defined in step (i).

The zero point may be an ideal zero point formed by interference, in which the intensity of the excitation light actually goes down to zero. A lower remaining or residual intensity of the excitation light in the zero point, however, is harmless, particularly as it is no goal of the third embodiment of the method to position the zero point, if present at all in the intensity distribution of the excitation light, in the sample in such a way that its position coincides with the position of the molecule in the sample. For the same reason, the zero point delimited by the intensity increasing regions may generally also be made up by Gaussian intensity distributions arranged at a distance in the respective spatial dimension, particularly by the intensity minimum between such Gaussian intensity distributions. Further, the at least one intensity increasing region may also be provided by a flank of only one Gaussian intensity distribution. In this case, however, the center of intensity of the excitation light focused into the Gaussian intensity distribution is the only model point of the intensity distribution available but is quite far away from the small intensities of the excitation light in the intensity increasing region which are of particular interest.

Even with an intensity increasing region extending in one spatial dimension only, the position of the molecule in the sample can be determined at a high spatial resolution in two or all three spatial dimensions. Similarly, with an intensity increasing region extending in two spatial dimensions only, the position of the singularized molecule in the sample may not only be determined at a high spatial resolution in these two but also in all three spatial dimensions. For this purpose, the third embodiment of the method has to be executed more than once with aligning the intensity increasing region(s) with different spatial dimensions. These executions with different alignments of the intensity increasing regions may take place one after the other or quasi-simultaneously, like for example by repeating the steps (i) and (ii) only after having them executed at least once for all different alignments of the intensity increasing region(s).

In the third embodiment of the method, the preliminary local area in which the molecule is located may be determined in different ways. Examples of this determination are given below.

That, in step (i) of the third embodiment of the method, the at least one position of the model point of the intensity distribution in each spatial dimension is defined such that the at least one intensity increasing region, in the respective spatial dimension, extends over the preliminary local area, means that the molecule is for sure located in that region of the intensity distribution of the excitation light which is influenced by the intensity increasing region with regard to the intensity of the luminescence light from the molecule.

That in step (ii) intensity values of the luminescence light are evaluated which include two intensity values per each of the spatial dimensions, one of which being the intensity of the luminescence light registered for the at least one position of the model point of the intensity distribution, does not exclude that the respective second intensity value for the respective spatial dimension is the same value for all spatial dimensions so that in step (ii) in total only n+1 intensity values are evaluated, "n" being the number of the spatial dimensions in which the position of the singularized molecule is determined. Generally, however, one additional intensity value can be considered per each spatial dimension so that a total of 2n intensity values is evaluated.

In order to determine in step (ii) the further local area in the sample in which the molecule is located and which is smaller than the preliminary local area, the dependency of the intensity of the luminescence light which is emitted by the singularized molecule on the distance of the singularized molecule to the model point of the intensity distribution of the excitation light is to be considered. This dependency results from the known course of the intensity of the excitation light in the intensity increasing region strictly monotonically increasing or decreasing in the direction of this distance, and also from the photo-physical process on which the excitation of the molecule for emission of luminescence light is based. Thus, with an intensity increasing region adjoining a zero point formed by destructive interference and a photoluminescence on basis of a single photon process there is an approximately quadratic dependency of the intensity of the luminescence light emitted by the molecule on its distance to the zero point. With a photoluminescence on basis of a two photon process, this dependency is even stronger and follows a function $x^4$. Practically, in the third embodiment of the method, the strictly monotonic course of the intensity of the excitation light in the intensity increasing region has only to be known insofar as it has an effect on the intensity of the luminescence light from the molecule. I.e. the dependency of the intensity of the luminescence light on the distance of the molecule to the model point of the intensity distribution of the excitation light has to be known to be able to consider it in determining the further spatial area. This dependency, however, can be determined easily, for example empirically by scanning the surroundings of the molecule with the intensity increasing region in small steps.

That in step (ii) the smaller further local area of the molecule in the sample is determined from intensity values of the luminescence light which include two intensity values of the luminescence light per each spatial dimension does not only include the option of considering different rates of photons of the luminescence light but also the option of considering intervals in time at which the photons are registered. It is to be understood that the average value of the intervals in time at which the photons are registered for a position of the model point of the intensity distribution of the excitation light is equal to a reciprocal value of the rate of the photons of the luminescence light registered.

In the third embodiment of the method, the steps (i) and (ii) are at least repeated once, i.e. the local area in which the molecule is located in the sample is at least two times reduced in size with regard to the preliminary local area. This means that in the third embodiment of the method the local area of the molecule in the sample is reduced in size at least twice with regard to its first approximation. There may, however, be further reductions of the local area in size in a same way or in another way. The local area reduced in size obtained after the at least two reductions in size of the preliminary local area may also be used directly to indicate the position of the singularized molecule, for example as a center of the local area with the radius of the local area as a possible position error.

The second intensity value for the respective spatial dimension, which is evaluated in step (ii) of the third embodiment of the method, may be an intensity of the luminescence light registered for a second position of the model point of the intensity distribution in the sample. This second position may be on the same side as the at least one position of the model point of the intensity distribution or on another side of the preliminary local area opposite to the at least one position of the model point of the intensity distribution in the respective spatial dimension. In any in these variants of the third embodiment of the method, the effect of the different intensities of the excitation light in the intensity increasing region is recorded at two different positions of the model point of the intensity distribution of the excitation light, and it is known where these two different positions are located with regard to the preliminary local area in the respective spatial dimension.

Considering the known course of the intensity of the excitation light in the intensity increasing region, in combination with the distance of the two different positions of the model point in the respective spatial dimension, it is possible to deduce the actual position of the molecule in the respective spatial dimension from the two intensities of the luminescence light registered for the two different positions of the model point. Also in this variant of the third embodiment of the method, there is no need to consider two separate or extra positions of the model point per each spatial dimension with regard to the intensities of the luminescence light registered for them. Instead, for determining the position of the molecule in two spatial dimensions, the positions of the model point may be arranged in the corners of a triangle extending in a plane spanned by these two spatial dimensions, i.e. in only three positions in total. Correspondingly, for determining the position of the molecule in three spatial dimensions, the positions of the model point may be located in the corners of a tetrahedron. Principally, two separate or extra positions of the model point per spatial dimension in which the position of the molecule is determined are also possible. With regard to the aspect of determining the position of the molecule in the sample based on as few photons of the luminescence light as possible, however, the resulting higher number of positions of the model point in the sample, for which the luminescence light is registered, may not be ideal.

In another variant of the third embodiment of the method, the second intensity value for the respective spatial dimension in step (ii) is a measure of the relative brightness of the singularized molecule. This measure may particularly be a maximum intensity of the luminescence light from the molecule when excited with the excitation light or an intensity value directly correlated therewith. The maximum intensity or the intensity value correlated therewith may be actually measured for the singularized molecule, or it may be estimated for all potential singularized molecules with a certain value.

In the third embodiment of the method, the luminescence light for the different positions of the model point of the intensity distribution in the sample may be registered quasi-simultaneously in that the model point is repeatedly shifted between these positions in the sample. For this purpose, the same intensity distribution of the excitation light may be shifted by means of a scanner. It is, however, also possible to newly form the intensity distribution for each of the different positions of its model point in the sample, for example by means of a spatial light modulator (SLM) arranged in the beam path of the excitation light. Then, at least insofar, there is no need of a scanner. Further, it is possible to shift the model point of the intensity distribution of the excitation light in the sample in that the excitation light is provided by completely or partially different light sources one after the other. In all these possible variants of the third embodiment of the method, the model point of the intensity distribution of the excitation light may be repeatedly shifted between its positions in the sample. It is to be understood that the luminescence light from the molecule belonging to the individual positions of the model point is registered separately. The quasi-simultaneous registration of the luminescence light for the different positions of the model point of the intensity distribution of the excitation light has the advantage that subjecting the sample to the excitation light and registering the luminescence light from the sample may be aborted immediately if the photons of the luminescence light registered for the individual positions of the model point of the intensity distribution of the excitation light already allow for reducing the preliminary local area in the sample, in which the molecule is arranged, by a predetermined or desired measure.

A corresponding abort criterion may also be applied when continuously registering the luminescence light for each position of the model point of the intensity distribution of the excitation light in the sample. There are, however, cases in which simultaneously monitoring the intensities of the luminescence light registered for all positions of the model point of the intensity distribution of the excitation light already after a smaller total number of photons from the molecule indicates that the preliminary local area may be reduced in size by the desired measure.

If, in the third embodiment of the method, the luminescence light, for each of the positions of the model point of the intensity distribution of the excitation light, is only registered until the intensities of the registered luminescence light are determined for these positions at a sufficient precision such that the further local area can be determined at a size reduced by a predetermined value as compared to the preliminary local area, this predetermined value may be in a range of 5% to 75%. Here, this percentage relates to the extension of the spatial area in the respective spatial dimension. It is to be understood that the intensities of the luminescence light registered for the different positions of the model point of the intensity distribution of the excitation light have to be determined the more precisely the farther the further local area shall be reduced with regard to the preliminary spatial area. A lower reduction in size requires a lower precision of measuring the intensities of the luminescence light for the different positions of the model point but more repetitions of the steps (i) and (ii) of the third embodiment of the method to achieve a same precision. Here, an optimization may be carried out with regard to the number of the photons of the luminescence light which are needed for achieving a certain precision in determining the position of the molecule in the sample.

As already mentioned, the entire preliminary local area, at each position of the model point, should be in a region of the intensity distribution of the excitation light in which the intensities in the intensity increasing region remain below the saturation intensity of the excitation light above which a further increase of the intensity of the excitation light does not result in a higher intensity of the luminescence light from the singularized molecule. In the third embodiment of the method, it is preferred that a maximum intensity, i.e. an absolute intensity level of the excitation light is always set such that the preliminary local area, with regard to each of the positions of the model point of the intensity distribution of the excitation light determined or defined in step (i), is in a region of not more than 90% of the saturation intensity of the excitation light.

With the size of the local area decreasing, the maximum intensity of the excitation light may be increased. In this way, the local area reduced in size may be again distributed over the full bandwidth of the different intensities of the excitation light in the intensity increasing region and thus over the full bandwidth of the different intensities of the luminescence light from the singularized molecule.

Particularly, the maximum intensity of the excitation light may be increased by at least 50% over all repetitions of the steps (i) and (ii). It may also be increased by at least 100% or even up to three times, four times or multiple times of its starting value.

The steps (i) and (ii) of the third embodiment of the method may be repeated until the further local area, in the final execution of step (ii), is not larger than a predetermined precision. This predetermined precision may be in a range of 20 nm or smaller. It may also be smaller than 10 nm. Even a predetermined precision in the order of 1 nm and thus down to 0.5 nm is possible. In principle, the third embodiment of the method has no inherent limit for or barrier to the precision achievable in determining the position of the singularized molecule in the sample. Circumstances of the respective individual case, like for example a decreasing signal-to-noise-ratio, however, may limit the precision which is achievable in practice. Thus, getting below a predetermined signal-to-noise-ratio or a lower limit for an achieved further reduction of the size of the local area in which the singularized molecule is located may be defined as an abort criterion for the repetition of the steps (i) and (ii) in the third embodiment of the method.

In all embodiments of the method, the preliminary local area in which the molecule is presumably located may be determined in different ways. Examples are given in the following.

In all embodiments of the method, at the beginning of determining the position of the singularized molecule, a larger area of the sample including the singularized molecule may be scanned with the zero point in each spatial dimension. The position of the singularized molecule may be estimated from the course of the intensity of the luminescence light registered during scanning; and the estimated position may be used as a basis in defining the positions of the zero point in the sample. This spatial scanning of at least an area of the sample may be carried out with a comparatively low intensity of the excitation light and in comparatively big spatial and small temporal steps, because the position of the molecule, i.e. a limited local area in which the molecule is presumably located, will only be coarsely estimated therefrom. Instead of with the zero point of the intensity distribution of the excitation light, the larger area of the sample including the singularized molecule may also be scanned with a Gaussian intensity distribution of the excitation light, i.e. with a simple focused beam of the excitation light in each of the spatial dimensions at the beginning of determining the position of the singularized molecule. This corresponds to confocally microscopically imaging the singularized molecule in the sample.

In another variant of all embodiments of the method, the excitation light with the Gaussian intensity distribution is only directed point by point or on a circular or spiral track onto the larger area of the sample including the molecule at the beginning of determining the position of the singularized molecule. The position of the singularized molecule is then estimated from the course of the intensity of the luminescence light over the points or tracks, and the estimated position is used as a basis in defining the positions of the zero point in the sample. In order to limit the number of photons of the luminescence light emitted by the singularized molecule, the Gaussian intensity distribution may be moved very quickly and/or may be kept low with regard to the maximum intensity of the excitation light. In moving the Gaussian intensity distribution on circular or spiral tracks, the intensity increasing region in the periphery of the Gaussian intensity distribution of the excitation light may be used to subject the singularized molecule to a low intensity of the excitation light only, which is, however, sufficient to determine a limited local area in which the molecule is presumably located by localization of the molecule.

In a further variant of all embodiments of the method, an area of the sample including the singularized molecule is all over, i.e. completely subjected to the excitation light and imaged on a detector registering the luminescence light with spatial resolution, like for example a camera, at the beginning of determining the position of the singularized molecule. Then, the position of the singularized molecule may be estimated from the spatial distribution of the luminescence light registered with the detector, and the estimated position may be used as a basis in defining the positions of the zero point in the sample. As there is no need to limit the local area in which the molecule is presumably located to a particular small size, a few photons from the singularized molecule are sufficient for this estimation.

In all steps which may be carried out at the beginning of determining the position of the singularized molecule to estimate the position of the molecule or to determine a limited local area in which the molecule is presumably located, a maximum intensity of the luminescence light from the molecule when excited by the excitation light or an intensity value correlated therewith, which is a measure of the relative brightness of the singularized molecule, can also be determined.

In all embodiments of the method, the luminescence light may generally be registered with a spatially resolving detector, like for example a camera, or with a smaller array of for example 2×2 or 3×3 point sensors only. From the spatial distribution of the photons of the luminescence light from the singularized molecule registered over the different positions of the zero point, the position of the singularized molecule may additionally be determined by localization. Here, a different position of the molecule in the sample determined by localization may indicate a certain orientation of the molecule in the sample, because, in contrast to the position of the molecule in the sample determined according to the present method, the position of the molecule in the sample determined by localization is dependent on the orientation of the molecule. In all embodiments of the method, it has no effect where an respective photon emitted by the molecule is registered for a respective position of the zero or model point of the intensity distribution of the excitation light. Correspondingly, in all embodiments of the method, the luminescence light may be registered with a point detector.

In all embodiments of the method, the sample, prior to determining the position of the singularized molecule, may be subjected to a switching signal which singularizes the molecule with regard to neighboring similar molecules in that it switches the neighboring similar molecules—in contrast to the singularized molecule—into a dark state in which they are not excitable for emission of luminescence light with the excitation light. This dark state may be another conformation state of the molecules which is not luminescent. It may, however, also be an electronic dark state. Alternatively, the switching signal may only switch the molecule to be singularized out of a dark state into a luminescent state. The switching signal may be switching light with another wavelength and another intensity than the excitation light. It may also have the same wavelength as or just another intensity than the excitation light. Generally, the switching signal may also be the excitation light as such.

A repeated execution of the embodiments of the method may be used for determining the positions of a plurality of molecules which are excitable with excitation light for emission of the fluorescence light, which mark a structure of interest in the sample and which are singularized one after the other. In another embodiment, this repeated execution of the embodiments of the method serves for tracking of the singularized molecule moving within the sample. Here, in each repetition of the embodiments of the method, may, an error area surrounding the previously determined position of the molecule may be taken as the limited local area in which the molecule is presumably located. The extension of this error area has to be adapted to the maximum moving velocity of the molecule in the sample.

An STED laser scanning fluorescence light microscope may be used for carrying out the embodiments of the method. Particularly, the STED light provided by the STED laser scanning fluorescence light microscope and comprising a zero point with adjoining intensity maxima may be used as the excitation light.

Further information with regard to possible embodiments of the embodiments of the method may be taken from U.S. Pat. No. 9,719,928 B2 which is incorporated herein by reference. Every detail which is disclosed in U.S. Pat. No. 9,719,928 B2 and which is not in contradiction to the embodiments of the method may also be realized as a detail of the embodiments of the method.

Referring now in greater detail to the drawings, FIG. 1 schematically shows an STED laser scanning fluorescence light microscope 1 with which the embodiments of the method may be carried out. In carrying out the embodiments of the method, not all components of the STED laser scanning fluorescence light microscope 1 will necessarily be used. The STED laser scanning fluorescence light microscope 1, however, includes all components which are necessary or needed for carrying out the embodiments of the method. In using the STED laser scanning fluorescence light microscope 1 for carrying out the embodiments of the method, a light source 2, which in a normal use of the STED laser scanning fluorescence light microscope 1 provides STED light, provides excitation light 3. By means of beam formers 4, the excitation light 3 is formed such that it comprises an intensity distribution with at least one intensity increasing region in the focus of an objective 5. In one embodiment of the method, the excitation light 3 comprises an intensity distribution with a zero point in the focus of the objective and neighboring intensity maxima on both sides in all spatial dimensions in which a position of a singularized molecule in a sample 6 is to be determined. The flanks of these intensity maxima provide the intensity increasing regions which are used in all embodiments of the method. The beam formers 4 may comprise passive components only or an active optic, like for example a spatial light modulator (SLM). In carrying out the embodiments of the method, a further light source 7 of the STED laser scanning fluorescence light microscope 1, which in normal use provides excitation light, may provide switching light 8 to singularize the molecule in the sample 6, whose position in the sample 6 is determined afterwards. Singularizing the molecule may be based on that other similar molecules are switched with the switching light 8 into a dark state in which they are not excitable for emission of luminescence light by the excitation light 3. The switching light 8 is coupled into the beam path of the excitation light 3. For this purpose, a dichroitic beam splitter 9 is provided here. The intensity increasing regions adjoining the zero point of the intensity distribution of the excitation light 3 are shifted within the sample 6 by means of a scanner 10. Via a dichroitic beam splitter 11 which, from the point of view of the sample 6, is arranged in front of the scanner 10 luminescence light 12 from the sample 6 is coupled out of the beam path of the excitation light, and imaged onto a camera 14 by means of an optic 13. The camera 14 is an example of a spatially resolving detector for the luminescence light 12. Alternatively, the luminescence light 12 from the sample 6 is forwarded towards a point detector 16 with an upstream pinhole aperture 17 by means of a dichroitic beam splitter 15. The luminescence light 12 coming from the sample 6 is emitted by the singularized molecule which is excited for emission of luminescence light with the excitation light 3. The process on which this emission of luminescence light is based is photo-luminescence, particularly fluorescence. The sample 6 is arranged on a sample holder 18. By means of the sample holder 18, the sample may, for example, additionally be movable in z-direction, i.e. in direction of an optical axis of the objective 5, to additionally shift the intensity increasing regions adjoining the zero point of the intensity distribution of the excitation light 3 in this direction within the sample 6, particularly if the zero point is also delimited by intensity maxima of the excitation light in z-direction. The sample 6 is imaged onto the camera 14 in such a way that a localization of the singularized molecule is possible from the spatial distribution of the photons of the luminescence light 12 from the molecule over the camera 14. With all embodiments of the method, the position of the molecule in the sample 6 is, however, at least additionally determined based on the intensities of the luminescence light 12 registered for different arrangements of the intensity increasing regions or positions of the zero point of the intensity distribution of the excitation light 3 within the sample 6.

Figure 2:
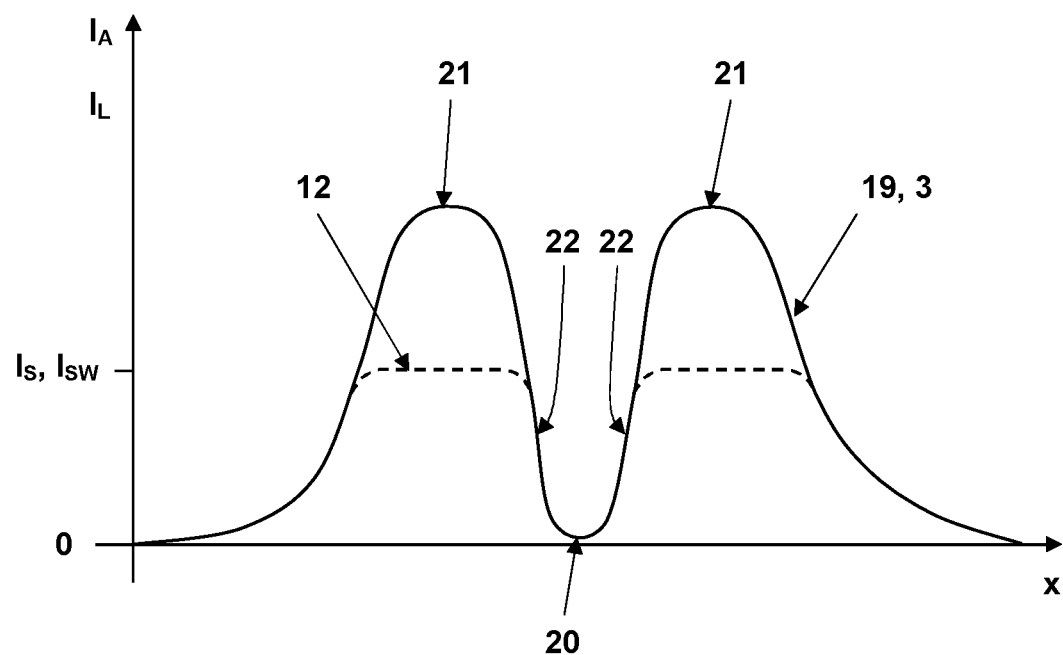
FIG. 2 shows a section through an intensity distribution of excitation light comprising a zero point with adjacent intensity maxima, which, in carrying out the method with the STED microscope according to FIG. 1, is directed onto a sample, and resulting intensities of luminescence light which is emitted by the luminescent molecule located at respective positions in the sample.

FIG. 2 depicts the intensity distribution 19 of the excitation light 3 along a section in x-direction perpendicular to the optical axis of the objective 5 according to FIG. 1. The intensity distribution includes a central zero point 20 in which the intensity $I_A$ of the excitation light 3 does down to zero or at least down to nearly zero. Intensity maxima 21 are neighbors to this zero point 2 on both sides. Between the zero point 20 and the intensity maxima 21 intensity increasing regions 22 are formed. In these intensity increasing regions 22, the intensity $I_A$ of the excitation light 3 increases from zero up to and beyond a saturation intensity $I_S$. At the saturation intensity $I_S$ the intensity $I_L$ of the luminescence light 12 excited by means of the excitation light 3 reaches a saturation value $I_{SW}$ above which the intensity $I_L$ does not increase further. The intensity distribution 19 of the excitation light 3 is symmetric with regard to the zero point 20, i.e. the intensity increasing regions are symmetric with regard to each other.

Figure 3:
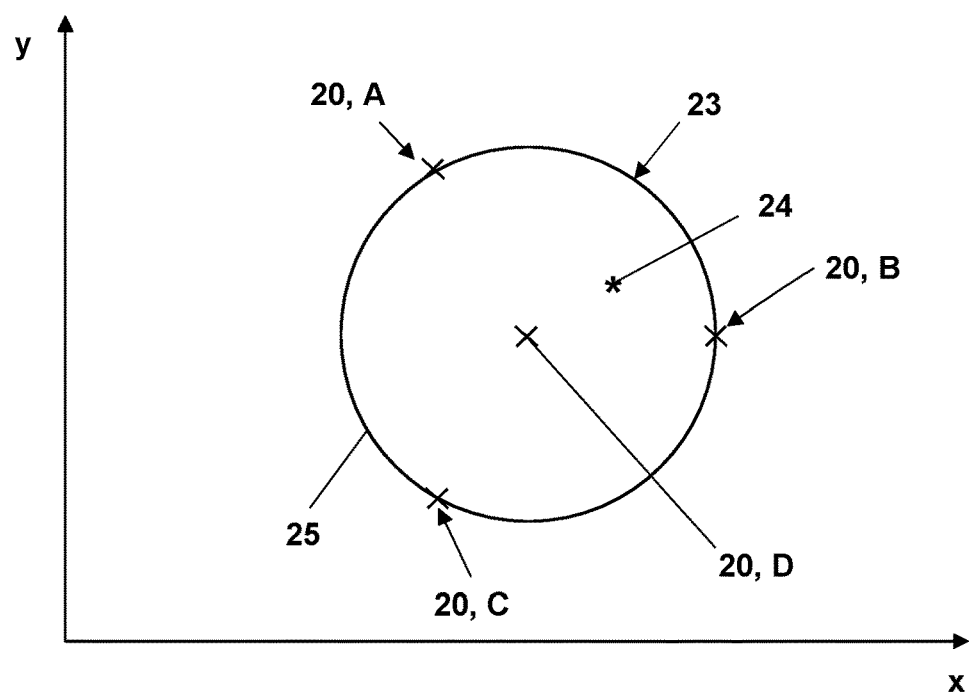
FIG. 3 illustrates an execution of the first embodiment of the method with regard to a limited two-dimensional local area in the sample, in which the singularized molecule is presumably located.

FIG. 3 illustrates a limited local area 23 in the sample 6 in which the molecule 24 is presumably located. This local area 23 is a circle in the x-y plane. In order to determine the position of the molecule 24 in x- and y-direction, the zero point 20 of the intensity distribution 19 of the excitation light 3 is arranged at four positions A to D in the x-y plane with regard to the limited local area. Here, the three positions A to C which are also designated as peripheral positions are located on a circular arc 25 around the limited local area 23, and they are arranged along the circular arc 25 at equal distances. The fourth position D of the zero point 20 is located in the center of the limited local area 23, and thus in the center of the circular arc 25. In other words, the positions A to C are arranged in the x-y plane in the corners of an equilateral triangle, and the position D is in the center of this triangle. The luminescence light 12 emitted by the molecule 24 due to its excitation with the excitation light 3 is separately registered for the positions A to D of the zero point 20 in the sample. With a rotationally symmetric shape of the intensity increasing regions 22 around the zero point 20 in the x-y plane, the intensity of the luminescence light 12 registered for the different positions A to D of the zero point 20 only depends on the distance a of the molecule 24 to the respective one of the positions A to D and on the course 26 of the intensity $I_L$ of the luminescence light over this distance a, as it is depicted in FIG. 4.

Figure 4:
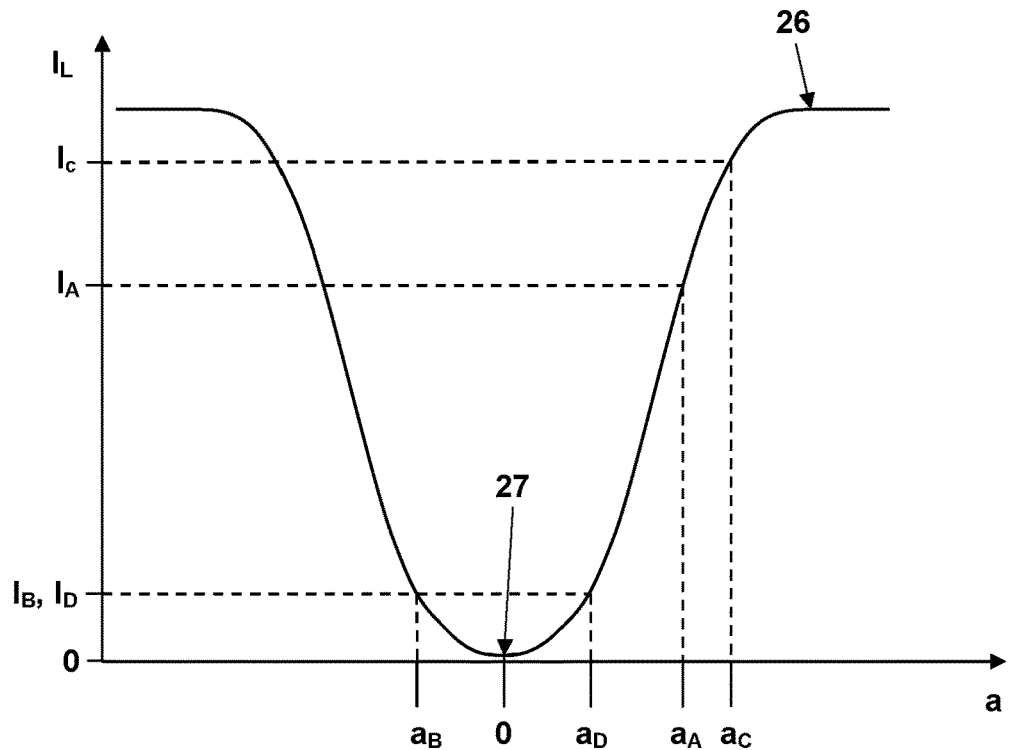
FIG. 4 illustrates the relations between different intensities of the luminescence light registered in carrying out the first embodiment of the method for different positions of the zero point of the intensity distribution of the excitation light in the sample.

FIG. 4 also depicts the distances $a_A$ to $a_D$ of the molecule 24 to the zero point 20 for the positions A to D and the intensities of the luminescence light $I_A$ to $I_D$ resulting therefrom. In that these intensities are measured in the first embodiment of the method, the associated distances $a_A$ to $a_D$ can be determined from the course 26, and on this basis the position of the molecule 24 can be determined with regard to the known positions A to D. As the intensities $a_A$ to $a_D$ may each only be determined at a certain accuracy which depends on the number of photons of the luminescence light 12 registered for the positions A to D, the position of the molecule 24 may also not be determined exactly but only at a certain precision. As compared to the total numbers of photons of the luminescence light 12 needed for this purpose, however, the precision at which the position of the molecule 24 is determined according to the embodiments of the method is very high. It is particularly clearly higher than in case of localizing the molecule 24 on basis of a spatial distribution of the photons of the luminescence light from the molecule 24 which is detected with a spatially resolving detector like the camera 14 according to FIG. 1. As an alternative to determining the position of the molecule 24 with regard to the positions A to D on basis of the distances $a_A$ to $a_D$, a function describing the course 26 may be fitted to the intensities $I_A$ to $I_D$ measured for the positions A to D, and the position of the zero point 27 of the fitted function may be taken as the position of the molecule 24 in the sample.

In actually testing the first embodiment of the method, the position of the molecule could be determined at a precision of about 1 nm based on less than 5% of the photons of the luminescence light which would have been necessary for localization of the molecule 24 at the same precision.

Figure 5:
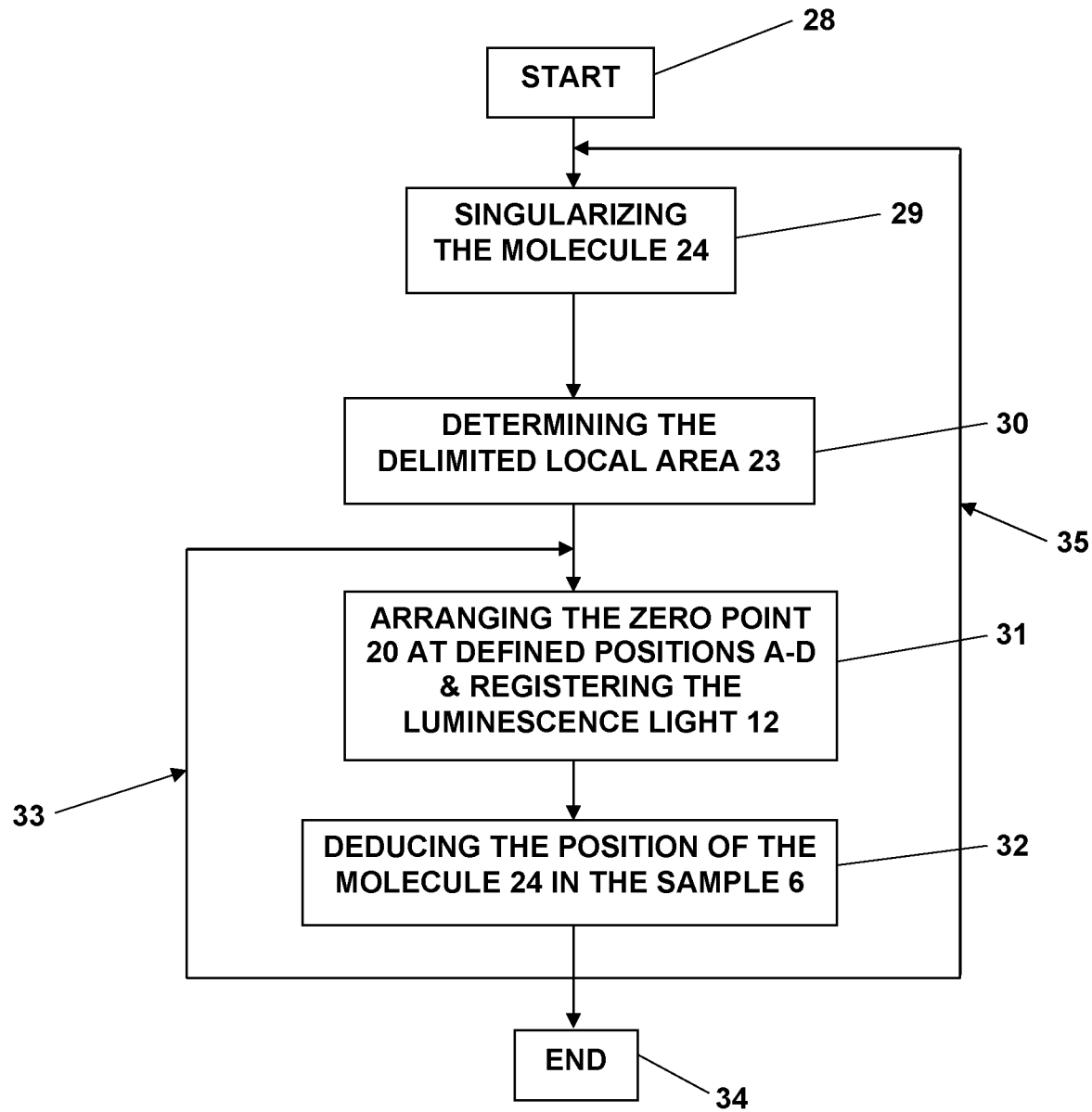
FIG. 5 is a block diagram of a variant of the first embodiment of the method.

The variant of the first embodiment of the method depicted in FIG. 5 as a block diagram, after a start 28, begins with singularizing 29 the molecule. Next, the limited local area 23 in which the molecule is presumably located is determined 30, for example in that the full sample 6 is subjected to the excitation light 3 and in that the luminescence light 12 emitted out of the sample is imaged onto the camera 14. Then, a procedure 31 follows which consists of arranging the zero point 20 at defined positions A to D and registering the luminescence 12 for these positions A to D. Next, the position of the molecule 24 in the sample 6 is deduced 32 from the intensities of the luminescence light 12 registered for the different positions A to D. A loop 33 in which the procedure 31 and the step of deducing 32 are repeated may be used to determine the position of the molecule 24 at an increased precision prior to the end 34. In the loop 33, the positions A to D of the zero point 20 are shifted towards the position of the molecule 24 in the sample 6 determined in the first step of deducing 32, and the absolute intensity of the excitation light is increased.

Often, however, the loop 33 may also be executed without arranging the positions A to D of the zero point more densely to, for example, follow, i.e. to track, a singularized molecule 24 moving within the sample. Here, the positions A to D may every time be arranged around that position of the molecule 24 that has been determined in the previous step of deducing 32. The local area 23 spanned by the positions A to D has to be set so large here that it still includes the molecule 24, even if it has moved after the latest registration of the luminescence light 12 as far as possible in the sample 6. A larger loop 35 includes the repetition of all steps 29 to 32 to always singularize another one of a plurality of molecules by which a structure of interest is marked in the sample 6. The sum of the determined positions of the singularized molecules 24 then describes the structure of interest in the sample at high spatial resolution.

Figure 6:
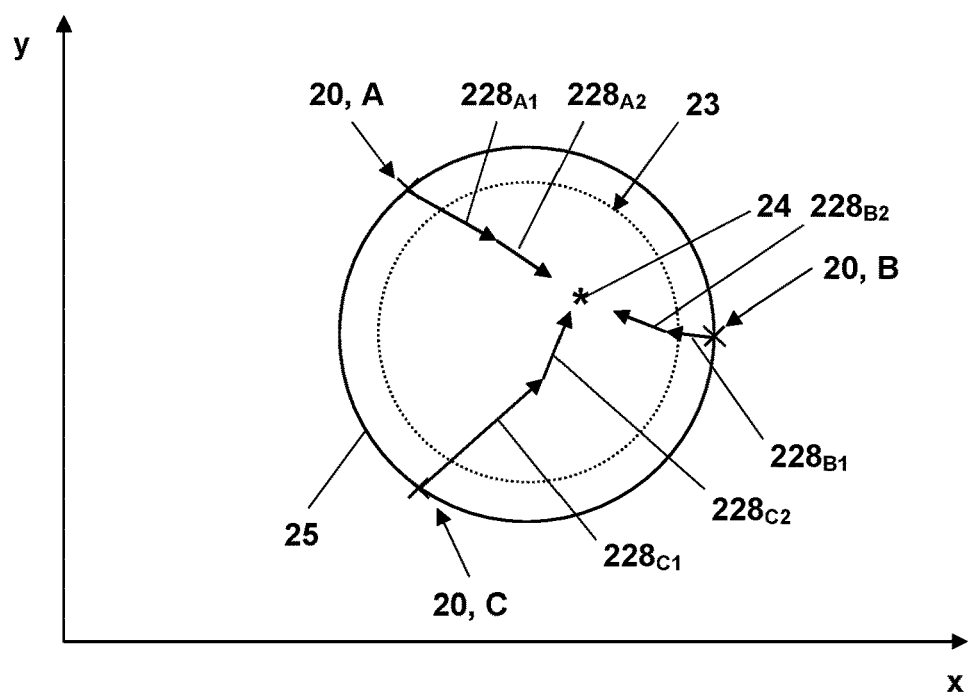
FIG. 6 illustrates an execution of the second embodiment of the method with regard to a limited two-dimensional local area in the sample, in which the singularized molecule is presumably located.

With regard to the second embodiment of the method, FIG. 6 illustrates a preliminary local area 23 in the sample 6 in which the molecule 24 is located due to previous measurements. Here, this local area is a circle in the x-y plane. To determine the position of the molecule 24 in x- and y-direction, three preliminary positions of the zero point 20 of the intensity distribution 19 of the excitation light 3 are defined in the x-y plane with regard to the preliminary local area. Here, the positions A to C are arranged on a circular arc which runs around the preliminary local area 23 at a distance so that in all spatial dimensions the preliminary local area 23 is arranged between the positions A to C. Along the circular arc 25, the positions A to C are arranged at equal intervals. In other words, the positions A to C are arranged in the corners of an equilateral triangle in the x-y plane. The luminescence light 12 emitted by the molecule 24 due to its excitation with the excitation light 3 is separately registered for the positions A to C of the zero point 20 in the sample. With a rotational symmetric formation of the intensity increasing regions 22 around the zero point 20 in the x-y plane, the intensity of the luminescence light 12 registered for the respective one of the different positions A to C of the zero point 20 only depends on the distance a of the molecule 24 to the respective position A to C and the course 26 of the intensity $I_L$ of the luminescence light over this distance a, as it is depicted in FIG. 7.

Figure 7:
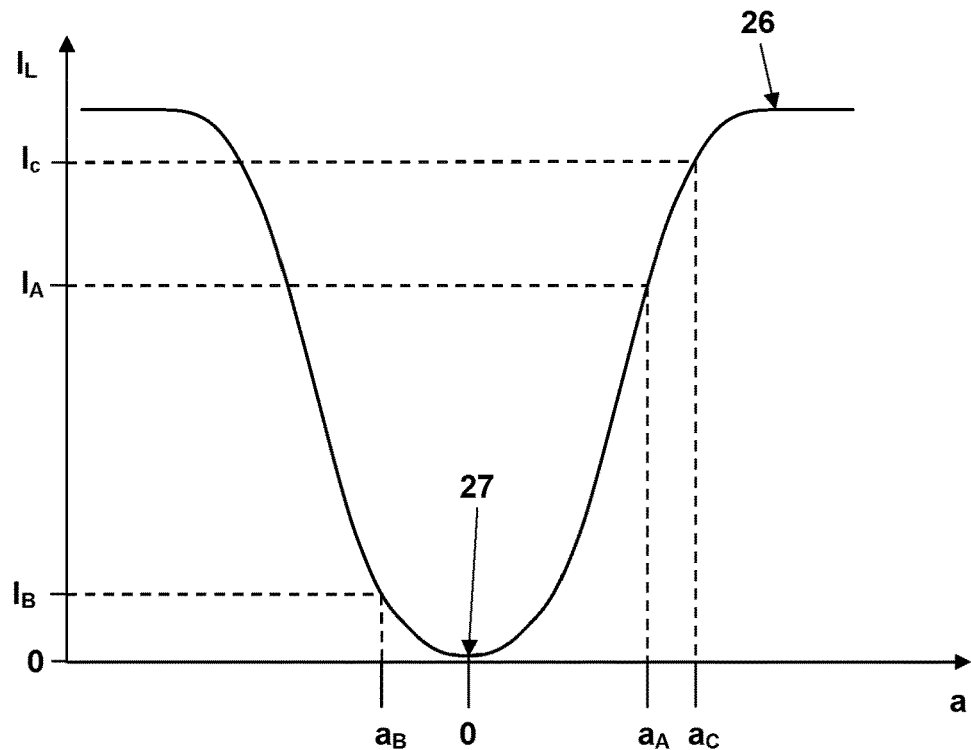
FIG. 7, in a depiction corresponding to FIG. 4, illustrates the relations between different intensities of the luminescence light registered in carrying out the second embodiment of the method for different positions of the zero point of the intensity distribution of the excitation light in the sample.

In FIG. 7, the distances $a_A$-$a_C$ of the molecule 24 to the zero point 20 and the resulting intensities of the luminescence light $I_A$ to $I_C$ are depicted for the positions A to C. If these intensities would be measured exactly, the associated distances $a_A$ to $a_C$ could be determined by means of the course 26, and on this basis the position of the molecule 24 could be exactly determined with regard to the known positions A to C. However, the accuracy at which the intensities are measured depends on the number of the photons of the luminescence light 12 registered for the positions A to C. A accurate measurement of the intensities $I_A$ to $I_C$ therefore requires that a high number of photons is registered for each of the positions A to C of the zero point 20.

The second embodiment of the method goes another way. According to this embodiment, relatively few and particularly only so many photons of the luminescence light are registered for the different positions A to C of the zero point that a conclusion can be drawn whether the respective position A to C of the zero point 20 is still comparatively far away from the molecule 24, i.e. whether the distance $a_A$ to $a_C$ is still large, and whether the distances $a_A$ to $a_C$ of the different positions A to C of the zero point 20 to the molecule 24 are about equal or certainly different. Depending on the result of this determination for which just a few photons of the luminescence light from the molecule 24 have to be registered at each of the positions A to C, the positions A to C are shifted into the preliminary local area 23, as illustrated by arrows $228_{A1}$ to $228_{C1}$ in FIG. 6. For the positions A to C of the zero point 20 shifted in this way, the luminescence light 12 from the molecule 24 is registered again to carry out the determination once more. As the arrows $228_{A1}$ to $228_{C1}$ depicted in FIG. 6 shift the positions A to C of the zero point 20 towards new positions A to C at equal distances to the molecule 24, equal rates or equal intervals in time of the photons of the luminescence light 12 will be measured at these new positions A to C. Correspondingly, the positions A to C will afterwards be shifted further towards their common center, which is indicated in FIG. 6 by arrows $228_{A2}$ to $228_{C2}$. In practice, many repetitions of the steps of shifting the positions A to C and registering the luminescence light from the molecule 24 for the different positions A to C may be carried out for bringing the positions A to C close to the molecule 24. Here, registering the luminescence light 12 for the different positions A to C occurs quasi-simultaneously to determine as quickly as possible how the rates of the photons or their intervals in time are related to each other and to shift the positions A to C in a suitable way as soon as possible, i.e. after as little as possible photons, with the purpose of bringing the positions A to C closer to the molecule 24. It is to be understood that the number of the photons of the luminescence light registered for each of the positions A to C up to the next step of shifting is correlated with the steps size by which the positions A to C can be suitably shifted afterwards. Generally, not all of the positions A to C have to be shifted after each step of registering the fluorescence light. It is also possible to only shift those positions A to C at which the rate of the photons is particularly high or at which the intervals in time between the photons are particularly small. This technique can be developed further so that each position A to C is always shifted when a certain number of photons has been registered for it, whereas the other positions A to C for which this is not yet the case are not yet shifted. By means of the second embodiment of the method, the local area of the molecule 24 in the sample may be very quickly, this means particularly based on a much lower number of photons than with a localization of the molecule 24 in the sample 6, strongly reduced in size. If the positions A to C are already very close to each other, the local area enclosed by them can be indicated as the position of the molecule +/- the precision achieved. Starting from these final positions A to C of the zero point 20, however, an even more precise determination of the position of the molecule 24 may take place, in that, for example, this position is deduced from the intensities of the luminescence light 12 determined for these positions A to C based on the course 26 according to FIG. 7.

Figure 8:
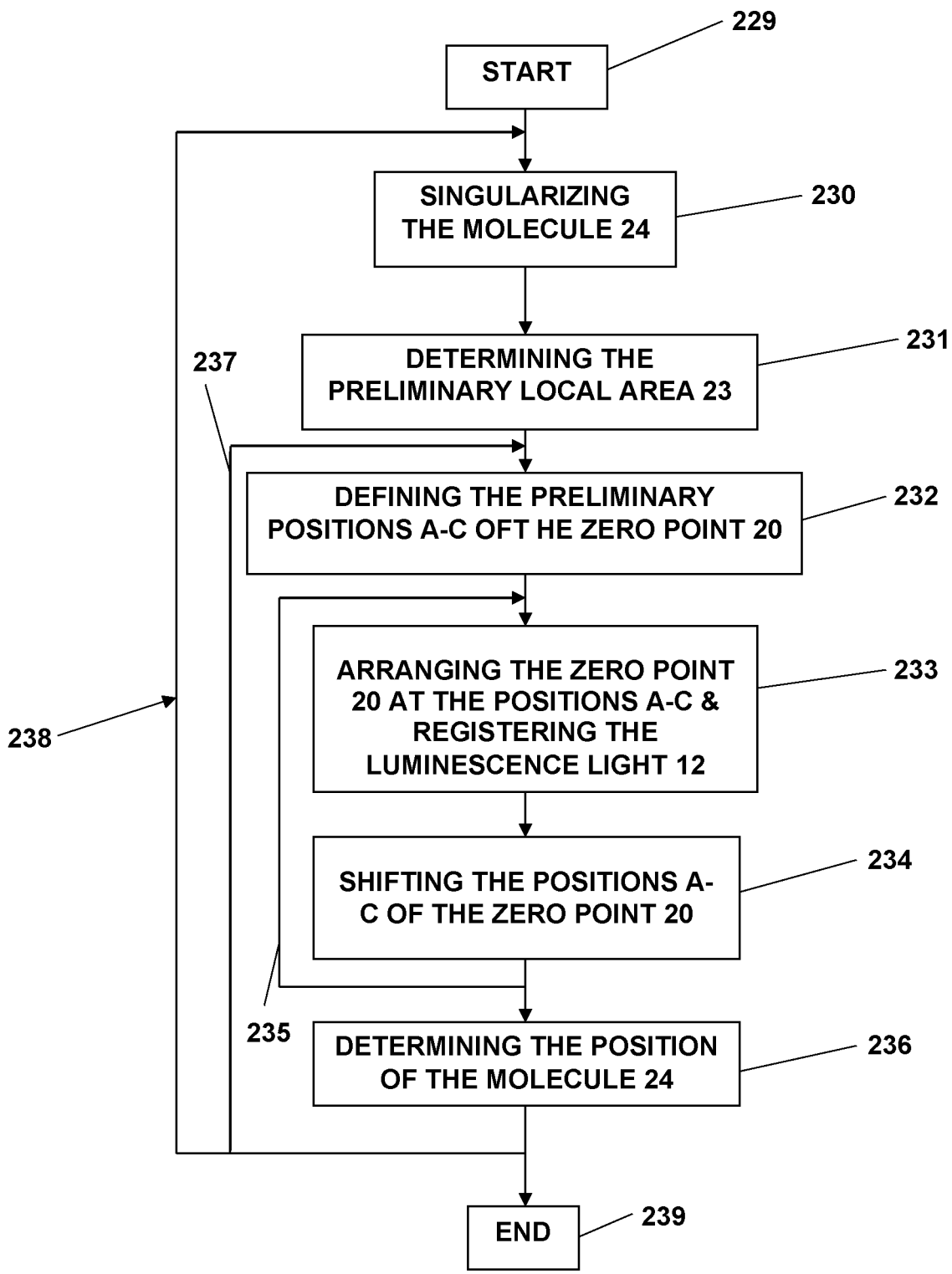
FIG. 8 is a block diagram of a variant of the second embodiment of the method.

The variant of the second embodiment of the method depicted in FIG. 8 as a block diagram, after a start 229, begins with singularizing 230 the molecule 24, for example by means of the switching light 8 according to FIG. 1. Next, the preliminary local area 23 is determined 231. In a step of defining 232, the preliminary positions A to C of the zero point 20 are defined with regard to the preliminary local area 23. Then, in a procedure 233, the zero point 20 is arranged at the positions A to C, and the luminescence light 12 emitted by the molecule 24 is separately registered for the positions A to C. In this procedure 233, while the luminescence light 12 is separately registered for the different positions A to C, the zero point 20 is shifted between the positions A to C in such a way that the luminescence light 12 is quasi-simultaneously registered for the different positions A to C. In the following step of shifting 234, the positions A to C of the zero point 20 are shifted into the preliminary local area 23 depending on the rates or the intervals in time at which the photons of the luminescence light 12 have been registered for the different positions A to C. The procedure 233 and the step of shifting 234 are repeated in a loop 235 until the positions A to C of the zero point 20 have approached the position of the molecule 24 in the sample up to a desired measure or precision. Then, in a step of determining 236 the position of the molecule 24 in the sample is for example determined as the local area delimited by the final positions A to C. The steps 232, 233, 234 and 236 inclusive of the loop 235 may be repeated in a further loop 237 to follow the molecule 24 as it is moving in the sample 6. This is called tracking the molecule 24. In tracking, the positions A to C may always be arranged around the position of the molecule 24 determined in the previous step of determining 236. The preliminary spatial area 23 which is afterwards spanned by the defined positions A to C is to be selected so large that it still includes the molecule 24 even if it has moved after the last procedure 233 over a maximum distance in the sample 6.

Alternatively, in a larger loop 238 the steps 230 and 231 may additionally be repeated to successively image a structure of interest in the sample 6 marked with a plurality of similar molecules 24. In this case, the end 239 is reached when the structure of interest is imaged as a desired level of completeness.

Figure 9:
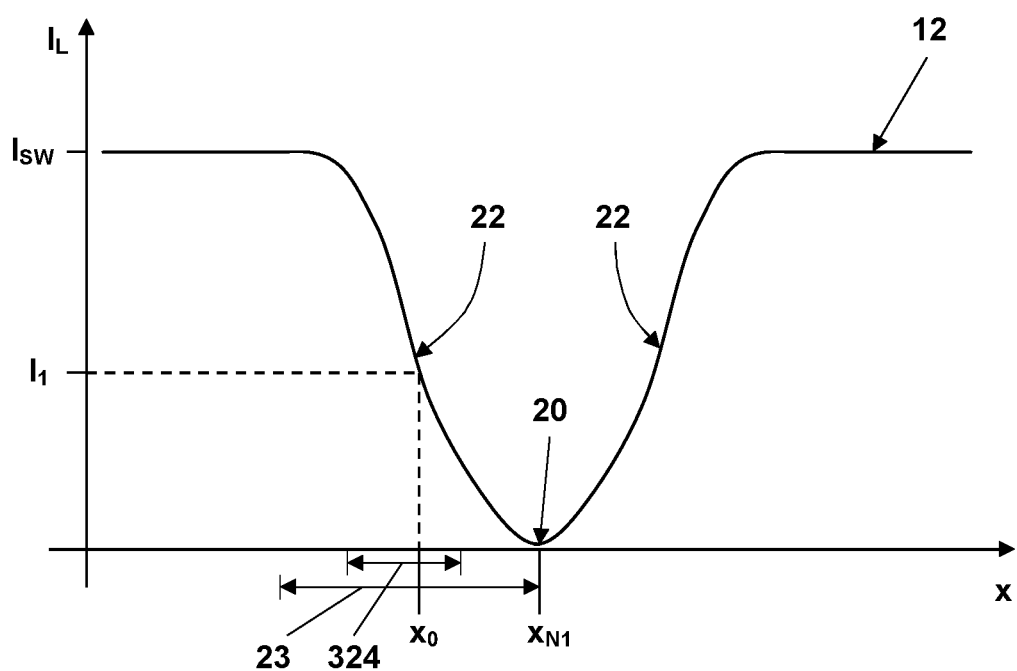
FIG. 9 illustrates a first execution of steps of the third embodiment of the method with regard to a first preliminary local area of the singularized molecule in the sample.

For the third embodiment of the method, FIG. 9 indicates, for one position of the zero point 20 at $x_N$ the resulting intensity $I_L$ of the luminescence light 12 depending on the position x of the singularized molecule in the sample. Over the intensity increasing regions 22, the intensity $I_L$ increases from zero up to a saturation value $I_{SW}$. In the third embodiment of the method this is used as follows: From the distribution of the luminescence light 12 emitted by the singularized molecule over the camera 14, which is registered while completely illuminating the sample 6 with the excitation light 3 according to FIG. 1, for example, a preliminary local area 23 is determined in which the position of the molecule in the sample 6 is located. By positioning the zero point 20 by means of the scanner 10 according to FIG. 1 at a position $x_{N1}$, the intensity increasing region 22 which is on the left hand side here is arranged in the sample 6 such that it covers the preliminary local area 23. Then, while subjecting the sample 6 to the excitation light 3, the luminescence light 12 emitted by the molecule located at the actual position $x_0$ is registered and its intensity $I_1$ is determined. The accuracy at which the intensity $I_1$ is determined depends on the number of the photons of the luminescence light 12 which are registered for this position $x_{N1}$ of the zero point. If the intensity $I_1$ as well as the saturation value $I_{SW}$ would exactly be known, the position $x_0$ of the singularized molecule could be exactly deduced from the known course of the intensity $I_L$ over the distance to the zero point 20. With a limited number of photons which are registered for determining the intensity $I_1$, however, an error remains. Similarly, an error remains in determining the saturation value $I_{SW}$ from, for example, the photons of the luminescence light 12 emitted by the molecule and registered with the camera 14 at the beginning. To the contrary, the course of the intensity $I_L$ of the luminescence light 12 can be determined rather exactly. Close to the zero point 20, the course of the intensity $I_L$, as a rule, quadratically depends on the distance to the zero point 20 with an excitation of the molecule for emission of the fluorescence light 12 via a single photon process. Despite of inaccuracies in determining $I_1$ and $I_{SW}$ it is thus possible to determine a further local area 324 based on the measurement of $I_1$, in which the position $I_0$ of the molecule is located and which is clearly smaller than the local area 23. This further local area 324 is depicted in FIG. 9 for certain error-prone measurement values of $I_1$ and $I_{SW}$.

Figure 10:
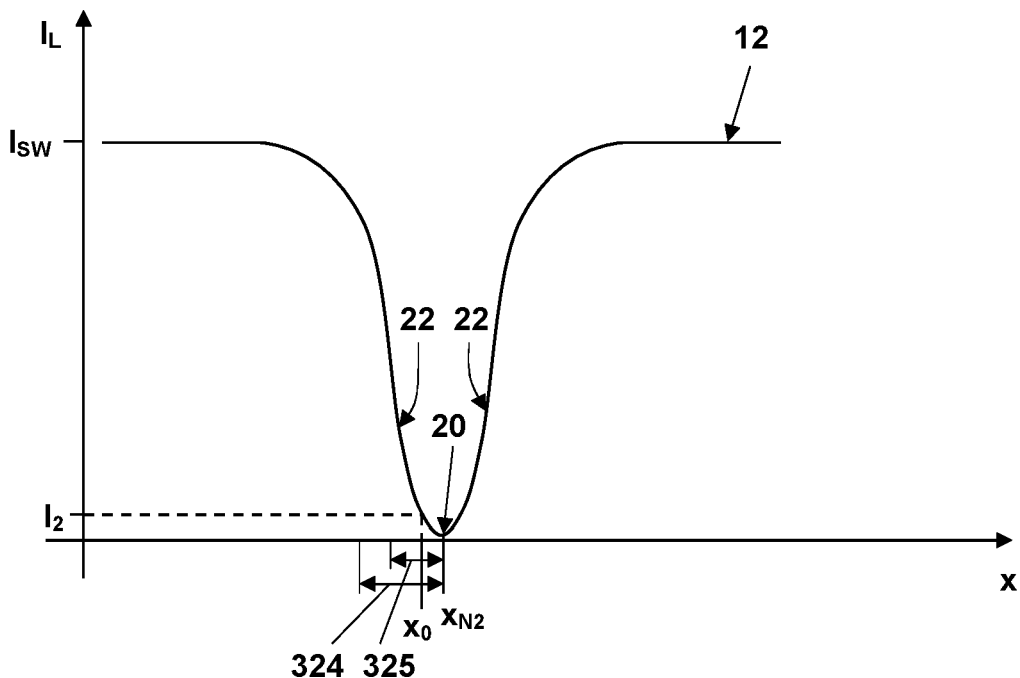
FIG. 10 illustrates a second execution of the steps of the third embodiment of the method with regard to a further preliminary local area of the singularized molecule in the sample, which has been reduced in size with regard to the first preliminary local area according to FIG. 9.

FIG. 10 shows how the knowledge of the further local area 324 is used for newly positioning the zero point 20 at the position $x_{N2}$ in the third embodiment of the method to determine the actual position $x_0$ of the molecule in the sample 6 at an even higher precision, i.e. at a higher spatial resolution. For this purpose, the position $x_{N2}$ of the zero point 20 is once again arranged such that the left hand side intensity increasing region 22 extends over the local area 324. Further, the absolute intensity of the excitation light 3 is increased such that the saturation value $I_{SW}$ of the luminescence light 12 is reached at a smaller distance to the zero point 20. Then, the intensity $I_2$ of the luminescence light 12 from the molecule is determined for this position $x_{N2}$ of the zero point 20. From this intensity $I_2$ and the saturation value $I_{SW}$, a further local area 325 can be determined in which the molecule is located in the sample 6 and which is now smaller than the local area 324. This further local area 325 may then be used for positioning the zero point 20 at an even further position in the sample 6 to determine the position $x_0$ of the molecule in the sample at an even higher precision. The local area 325, however, already indicates the position $x_0$ of the molecule in the sample at a much higher precision than the preliminary local area 23. In the actual practice of the third embodiment of the method, the position $x_0$ of the molecule in the sample 6 can be determined at an error of an order of not more than of 1 nm.

Instead of determining the further local area 324, 325 from the intensity $I_1$ or $I_2$, respectively, and the saturation value $I_{SW}$ of the intensity $I_L$ of the luminescence light 12, the zero point 20 may also be arranged at two different positions $x_{N1a}$ and $x_{N1b}$ in the sample to measure the associated intensities of the luminescence light 12 and to then determine the further local area 324, 325 from these two intensities and the course of the intensity $I_L$ over the distance to the zero point 20, without using the saturation value $I_{SW}$.

Figure 11:
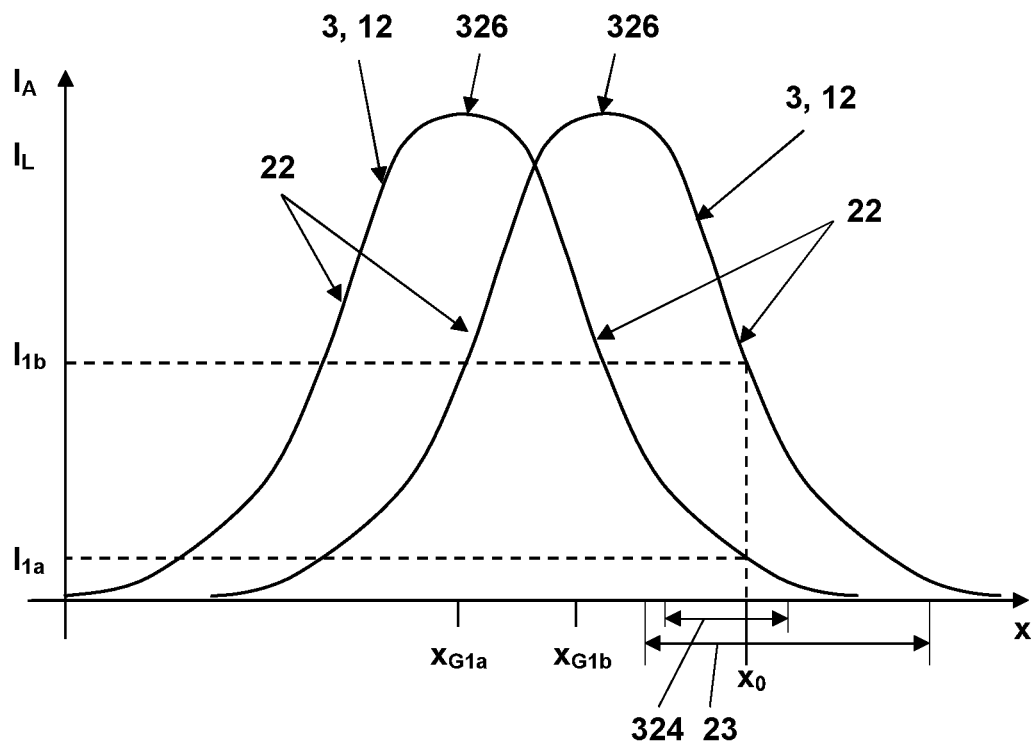
FIG. 11 illustrates an alternative in executing the steps of the third embodiment of the method with a Gaussian intensity distribution of the excitation light.

FIG. 11 illustrates a corresponding procedure using a Gaussian intensity distribution of the excitation light 3 which, due to the fact that no saturation value is reached, also results in a Gaussian intensity distribution of the luminescence light 12. The intensity increasing regions 22 are here found at the flanks of the Gaussian intensity distribution. In order to reduce the preliminary local area 23 of the position $x_0$ of the molecule in the sample 6 in size, the center of the intensity 326 of the Gaussian intensity distribution of the excitation light 3 is arranged at two different positions $x_{G1a}$ and $x_{G1b}$ so that each time the intensity increasing region 220 on the left hand side of FIG. 11 covers the preliminary local area 23. For each of these positions $x_{G1a}$ and $x_{G1b}$, the respective intensity $I_{1a}$ or $I_{1b}$ of the luminescence light 12 from the molecule is registered. From the intensities $I_{1a}$ and $I_{1b}$ in combination with the course of the intensity $I_L$ of the luminescence light 12 over the distance to the center of intensity 326, a smaller further local area 324 is determined in which the position $x_0$ of the molecule in the sample 6 is located. It has to be considered here, that FIG. 11 is not depicted at the same scale as FIGS. 3 and 4 and that, in order to advantageously use as low intensities of the excitation light 3 in the intensity increasing region 22 as possible to stress the singularized molecule as little as possible, the positions $x_{G1a}$, $x_{G1b}$ of the model point of the intensity distribution $I_A$ of the excitation light 3 have to be arranged much farther away from the position $x_0$ of the molecule in the sample of interest than the positions $x_{N1}$ or $x_{N2}$ of the zero point 20. This is due to the fact that the Gaussian intensity distribution $I_A$ of the excitation light 3 has a full width at half maximum of the diffraction barrier at the wavelength of the excitation light 3 and that the regions of small intensity $I_A$ of the excitation light 3 are about this full width at half maximum away from the center of intensity 326, whereas the small intensities of the excitation light 3 and the intensity increasing regions 22 in the intensity distribution of the excitation light 3 comprising the zero point 20 are directly adjoining the zero point 20.

Figure 12:
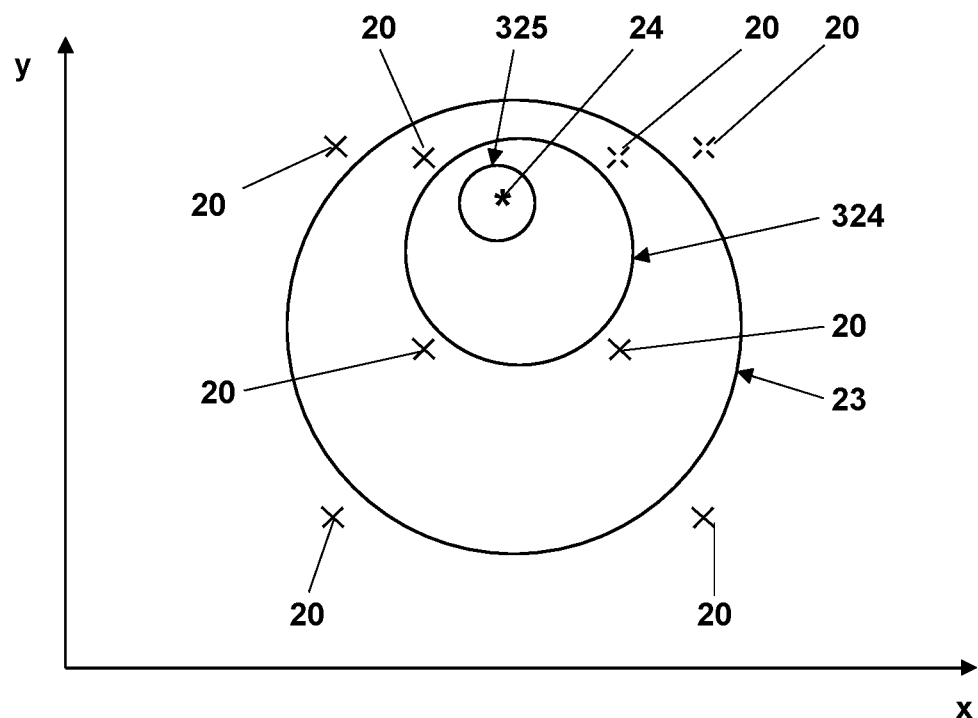
FIG. 12 illustrates two succeeding executions of the steps of the third embodiment of the method with a first relative arrangement of positions of a model point of the intensity distribution of the excitation light with regard to the preliminary local areas.

FIG. 12 depicts the preliminary local area 23 of the molecule in the sample 6 in an x-y plane perpendicular to the optical axis of the objective 5 according to FIG. 1. Around this local area, four positions of the zero point 20 which is used as the model point of the intensity distribution of the excitation light 3 according to FIG. 2 are arranged at equal distances. If the intensity of the luminescence light from the molecule 24 is registered for each of these positions of the zero point 20, it is possible to determine the further local area 324 therefrom. One of the positions of the zero point 20 depicted in FIG. 12 is just an option which is diagrammatically indicated with the position in the upper right of FIG. 12. Correspondingly, in a next step of the third embodiment of the method, the further local area 324 can be further reduced by positioning the zero point 20 at positions adjoining the further local area 325 which indicates the position of the molecule 24 in the sample 6 with an even smaller error. Here as well, one of the positions of the zero point 20 depicted in FIG. 12 is just an option which is once again diametrically indicated in the upper right of the figure.

Figure 13:
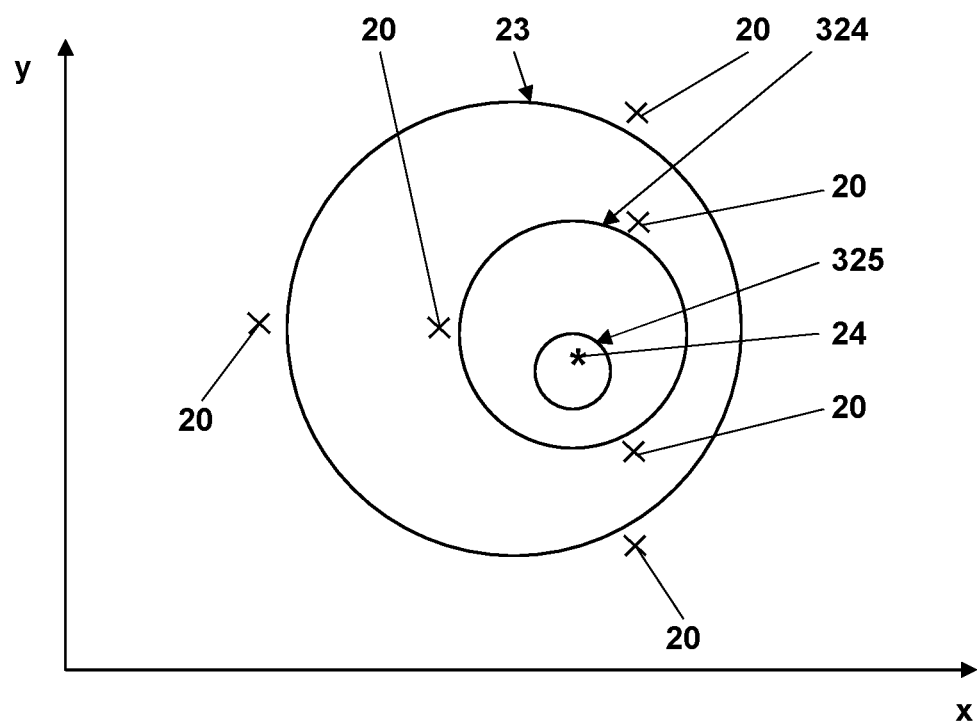
FIG. 13 illustrates two succeeding executions of the steps of the third embodiment of the method with another relative arrangement of the positions of the model point of the intensity distribution of the excitation light with regard to the preliminary local areas.

FIG. 13 shows another arrangement of the zero point 20 with regard to the preliminary local area 23 and the further local area 324 each time at three positions at equal distances. These three positions also include at least two different positions per spatial dimension x and y in which the position of the molecule 24 is determined.

The procedure illustrates in FIGS. 12 and 13 for two spatial dimensions may also be extended to three spatial dimensions. For this purpose, at least four positions of the zero point 20 have to be defined for each local area 23-325.

Figure 14:
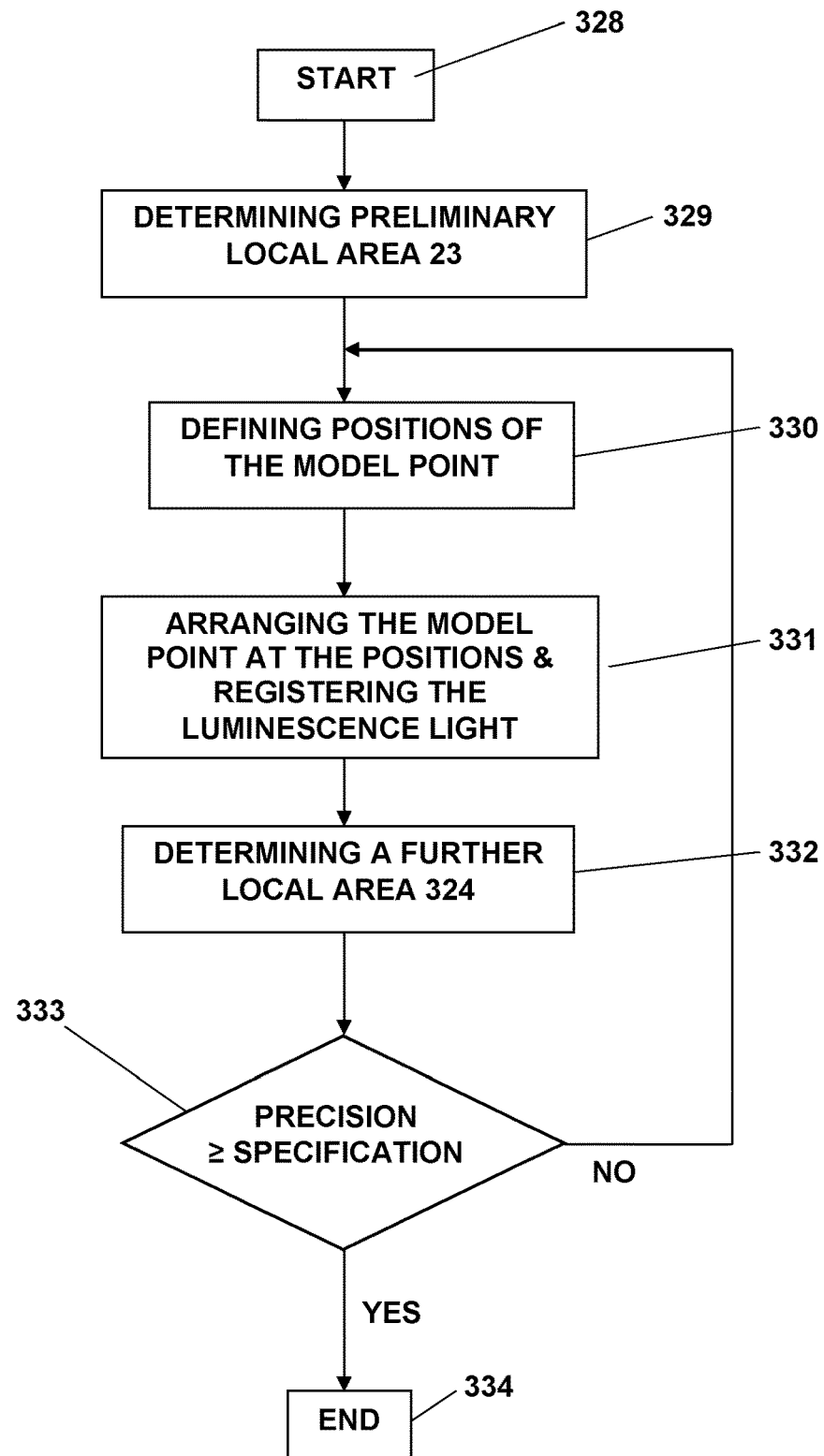
FIG. 14 is a block diagram of a variant of the third embodiment of the method for determining the position of a singularized molecule in a sample.

FIG. 14 is a block diagram of a variant of the third embodiment of the method. After a start 328, the preliminary spatial area 23 is determined 329. Then, positions of the model point, i.e. of the zero point 20 or the center of intensity 326, are defined 330 for the determined local area. In the following step 331, the intensity distribution of the excitation light 3 is directed onto the sample 6 with arranging the model point at the defined positions, and the luminescence light emitted by the singularized molecule in the sample 6 is separately registered for each of these defined positions. On basis of the intensities of the luminescence light registered in step 331, a further local area 324 is determined 332. Here, the saturation value $I_{SW}$ of the luminescence light from the molecule may additionally be used. Afterwards, it is checked 330 whether the precision indicated by the extension of the local area 324 already fulfils a predetermined specification of this precision. If the step of checking 333 has the result that the precision is not yet high enough, the steps 330-332 are repeated, wherein in the step of defining 330, the new positions of the model point are defined with regard to the further local area 324. If the step of checking 333 has a positive result, the end 334 of the method of determining the position of the molecule 24 in the sample 6 has been reached.

Figure 15:
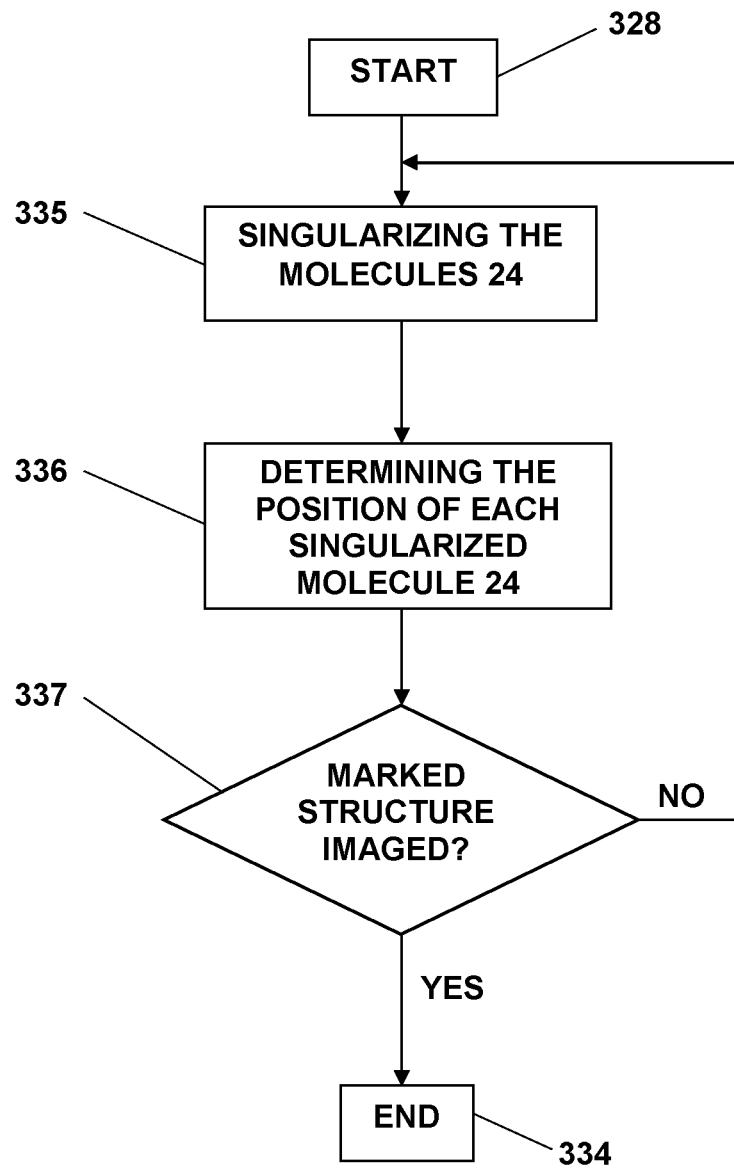
FIG. 15 is a block diagram of a repeated execution of the third embodiment of the method for imaging a structure in a sample marked with singularizable molecules.

FIG. 15 is a block diagram of a method in which the method according to FIG. 14 is repeatedly executed with regard to its steps 329-333. Here, a step of singularizing 335 the molecules follows to the start 328. Then, in a routine 336 using the steps 329-333 the position of each of the singularized molecules is determined. A step of checking 337 determines whether a structure marked with the molecules is already imaged at a sufficient level of detail. If not, some of the molecules which mark the structure are newly singularized. If the marked structure in checking 337 is regarded as sufficiently imaged, the end 334 is reached.

Figure 16:
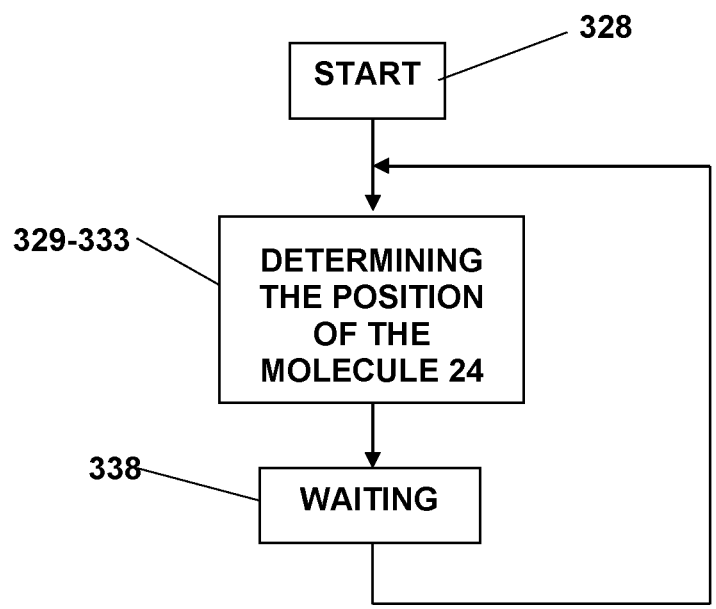
FIG. 16 is a block diagram of a repeated execution of the third embodiment of the method for tracking a movement of a singularized molecule in a sample.

FIG. 16 is a block diagram of a repeated execution of the steps 329-333 according to FIG. 14 for tracking a singularized molecule 24 in the sample 6. For this purpose, after the start 328, the present position of the molecule 24 is determined at the desired precision by executing the steps 329-333. Afterwards, it is optionally waited 338, or the present position of the molecule in the sample is directly determined once again. With each of the repetitions of the determination of the position of the molecule 24 by means of the steps 329-333, the latest previously determined smallest local area of the molecule 24 in the sample 6 may centrically be expanded to define a new preliminary local area which is then used as the preliminary local area 23 for the next execution of the steps 329-333. Here, the smallest local area which has been determined at last has to be expanded such that the molecule 24 may not have moved out of the expanded local area in the meantime.

Many variations and modifications may be made to the preferred embodiments of the invention without departing substantially from the spirit and principles of the invention. All such modifications and variations are intended to be included herein within the scope of the present invention, as defined by the following claims.

We claim:

1. A method of spatial high resolution determining, in n spatial dimensions, a position of a singularized molecule in a sample, the singularized molecule being excitable with excitation light for emission of luminescence light, and n being 1, 2 or 3, the method comprising
providing the excitation light with an intensity distribution which, in each of the n spatial dimensions, comprises at least one intensity increasing region with a known strictly monotonic course of an intensity of the luminescence light from the singularized molecule over a distance of the singularized molecule to a model point of the intensity distribution,
determining a preliminary local area in the sample which includes the singularized molecule,
directing the excitation light with the intensity distribution onto the sample, and
arranging the model point of the intensity distribution, in each of the n spatial directions, at different positions in the sample,
separately registering the luminescence light emitted by the singularized molecule for each of the different positions of the model point of the intensity distribution in the sample, and
deducing the position of the singularized molecule in the sample from the intensities of the separately registered luminescence light,
wherein (i) in each of the n spatial dimensions, at least one preliminary position of the model point of the intensity distribution is defined such that the at least one intensity increasing region associated with the respective one of the n spatial dimensions extends over the preliminary local area in the respective one of the n spatial dimensions,
wherein (ii) from intensity values of the luminescence light which include two intensity values for each of the n spatial dimensions, at least one of which being the intensity of the luminescence light registered for the at least one position of the model point of the intensity distribution in the respective one of the n spatial dimensions, a further local area in the sample is determined which includes the singularized molecule and which is smaller than the preliminary local area, and
wherein the steps (i) and (ii) are repeated at least once using the last further local area as the next preliminary local area.

2. The method of claim 1, wherein the intensity of the excitation light in the at least one intensity increasing region increases starting from zero at the model point.

3. The method of claim 1, wherein the model point is a zero point of the intensity distribution which, in each of the n spatial dimensions, is delimited on one side by the at least one intensity increasing region and on the other side by a further intensity increasing region.

4. The method of claim 3, wherein the at least one intensity increasing region and the further intensity increasing region are symmetric with regard to the zero point.

5. The method of claim 1, wherein the second intensity value for the respective one of the n spatial dimension is the intensity of the luminescence light registered for a second position of the model point of the intensity distribution which, in the respective one of the n spatial dimensions, is arranged
at another point on the same side of the preliminary local area as the at least one position of the model point of the intensity distribution or
at a point on an opposite side of the preliminary local area opposing the at least one position of the model point of the intensity distribution.

6. The method of claim 1, wherein the number of the different positions of the model point of the intensity distribution in the sample, which is defined in each execution of the step (i), is between n+1 and 2n.

7. The method of claim 1, wherein the second intensity value for the respective one of the n spatial dimension is a saturation value of the intensity of the luminescence light from the singularized molecule when excited with the excitation light.

8. The method of claim 1, wherein the luminescence light is quasi-simultaneously registered for the different positions of the model point of the intensity distribution in the sample in that the model point is repeatedly shifted between the different positions.

9. The method of claim 1, wherein the luminescence light is registered for the different positions of the model point of the intensity distribution in the sample only until the intensities of the registered luminescence light for the different positions are measured at a sufficient accuracy so that the further local area can be determined by a predetermined value smaller than the preliminary local area.

10. The method of claim 9, wherein the predetermined value by which the further local area in the respective spatial dimension can be determined smaller than the preliminary local area is in a range from 5% to 75%.

11. The method of claim 1, wherein a maximum intensity of the excitation light is adjusted such that the preliminary local area with regard to each of the different positions of the model point of the intensity distribution in the sample is in a region of not more than 90% of a saturation intensity of the excitation light.

12. The method of claim 11, wherein the maximum intensity of the excitation light is increased in at least one of the repetitions of the steps (i) and (ii).

13. The method of claim 12, wherein the maximum intensity of the excitation light is increased by at least 50% over all repetitions of the steps (i) and (ii).

14. The method of claim 1, wherein the steps (i) and (ii) are repeated until the further local area is no longer larger than a predetermined precision at which the position of the singularized molecule in the sample is to be determined.

15. The method of claim 14, wherein the predetermined precision is in a range between 0.5 and 20 nm.

16. The method of claim 1, wherein, at a beginning of determining the position of the singularized molecule, a larger area of the sample including the singularized molecule is scanned with at least one intensity increasing region or with a Gaussian intensity distribution of the excitation light in each of the n spatial dimensions, wherein the preliminary local area is determined from a course of an intensity of the luminescence light registered during scanning.

17. The method of claim 1, wherein, at a beginning of determining the position of the singularized molecule, the excitation light is directed with a Gaussian intensity distribution point by point or on a circular or spiral track onto a larger area of the sample including the singularized molecule, wherein the preliminary local area is determined from a course of an intensity of the luminescence light registered over the points or the spiral track, respectively.

18. The method of claim 1, wherein, at a beginning of determining the position of the singularized molecule, a larger area of the sample including the singularized molecule is as a whole subjected to the excitation light and imaged on a spatially resolving detector, wherein the preliminary local area is determined from a spatial distribution of the luminescence light registered with the detector.

19. The method of claim 1, wherein the luminescence light is registered at a spatial resolution, and wherein the position of the singularized molecule is additionally determined from a spatial distribution of all luminescence light which has been emitted by the singularized molecule and registered.

20. The method of claim 1, wherein the sample, prior to determining the position of the singularized molecule, is subjected to a switching signal which singularizes the molecule with regard to neighboring similar molecules, in that the neighboring similar molecules, after being subjected to the switching signal, are no longer excitable with the excitation light for emission of fluorescence light.

21. The method of claim 1, wherein the steps of claim 1 are repeatedly executed for determining the positions of a plurality of singularized molecules which are excitable with excitation light for emission of luminescence light and which together mark a structure of interest in a sample.

22. The method of claim 1, wherein the steps of claim 1 are repeated for tracking the singularized molecule when moving in the sample.

23. The method of claim 1,
wherein STED light provided by a laser light source of an STED laser scanning fluorescence light microscope is used as the excitation light,
wherein a scanner of the STED laser scanning fluorescence light microscope is used for arranging the model point of the intensity distribution at different positions in the sample, and
wherein a detector of the STED laser scanning fluorescence light microscope is used for separately registering the luminescence light emitted by the singularized molecule for each of the different positions of the model point of the intensity distribution in the sample.

* * * * *